(12) United States Patent
Sengupta et al.

(10) Patent No.: US 12,544,593 B2
(45) Date of Patent: Feb. 10, 2026

(54) INTERNAL DOSE-ADAPTED AUTOMATED EXTERNAL BEAM RADIATION THERAPY

(71) Applicant: Varian Medical Systems, Inc., Palo Alto, CA (US)

(72) Inventors: Debanti Sengupta, Santa Clara, CA (US); Patrick Kupelian, La Quinta, CA (US); Ryan Clark, Chandler, AZ (US); Luca Cozzi, Porto Valtravaglia (IT); Donald Hoang, San Francisco, CA (US)

(73) Assignee: VARIAN MEDICAL SYSTEMS, INC., Palo Alto, CA (US)

( * ) Notice: Subject to any disclaimer, the term of this patent is extended or adjusted under 35 U.S.C. 154(b) by 301 days.

(21) Appl. No.: 18/144,617

(22) Filed: May 8, 2023

(65) Prior Publication Data
US 2024/0374923 A1 Nov. 14, 2024

(51) Int. Cl.
*A61N 5/10* (2006.01)
*G16H 20/40* (2018.01)

(52) U.S. Cl.
CPC .......... *A61N 5/1038* (2013.01); *A61N 5/103* (2013.01); *A61N 5/1031* (2013.01); *A61N 5/1039* (2013.01); *A61N 5/1048* (2013.01); *A61N 5/1067* (2013.01); *A61N 5/1071* (2013.01); *G16H 20/40* (2018.01); *A61N 2005/1041* (2013.01); *A61N 5/1042* (2013.01);
(Continued)

(58) Field of Classification Search
CPC ........ A61N 5/10; A61N 5/103; A61N 5/1031; A61N 5/1037; A61N 5/1038; A61N 5/1039; A61N 5/1042; A61N 5/1045; A61N 5/1047; A61N 5/1048; A61N 5/1049; A61N 2005/1052; A61N 2005/1054; A61N 2005/1061; A61N 2005/1062; A61N 5/1064; A61N 5/1065; A61N 5/1067; A61N 5/1069; A61N 5/107; A61N 5/1071; A61N 2005/1072; A61N 2005/1074; A61N 2005/1087; A61N 2005/1089
USPC ......................................................... 378/65
See application file for complete search history.

(56) References Cited

U.S. PATENT DOCUMENTS 6,504,899 B2 * 1/2003 Pugachev .............. A61N 5/103
378/65
7,574,251 B2 * 8/2009 Lu ........................ A61N 5/1031
600/411
(Continued)

FOREIGN PATENT DOCUMENTS

EP 3628372 A1 4/2020

OTHER PUBLICATIONS

Archambault et al., "Making on-line adaptive radiotherapy possible using artificial intelligence and machine learning for efficient daily re-planning", Medical Physics International Journal, vol. 8, No. 2, 2020.
(Continued)

*Primary Examiner* — Allen C. Ho
(74) *Attorney, Agent, or Firm* — Potomac Law Group, PLLC

(57) ABSTRACT

Systems, devices and methods for internal dose adapted automated external radiation beam therapy, and systems and methods for an automated adaptive workflow to automatically generate a radiation treatment plan based on the internal dose and adapt the treatment plan to a current treatment session using a set of directives.

36 Claims, 19 Drawing Sheets

(52) U.S. Cl.
CPC ............... *A61N 2005/1052* (2013.01); *A61N 2005/1061* (2013.01); *A61N 2005/1062* (2013.01); *A61N 2005/1074* (2013.01)

(56) References Cited

U.S. PATENT DOCUMENTS

| | | | | |
|---|---|---|---|---|
| 7,639,854 | B2* | 12/2009 | Schnarr | A61N 5/1048 382/128 |
| 7,643,661 | B2* | 1/2010 | Ruchala | A61N 5/1048 382/128 |
| 7,773,788 | B2* | 8/2010 | Lu | A61N 5/103 382/128 |
| 8,260,013 | B2* | 9/2012 | Pekar | A61B 6/032 424/9.4 |
| 8,422,631 | B2* | 4/2013 | Takahashi | A61N 5/103 378/65 |
| 8,693,629 | B2* | 4/2014 | Sgouros | A61N 5/103 378/65 |
| 9,387,344 | B2* | 7/2016 | Sgouros | A61B 6/5217 |
| 9,764,162 | B1* | 9/2017 | Willcut | G06T 7/0014 |
| 9,789,337 | B2* | 10/2017 | Bani-Hashemi | A61B 5/055 |
| 10,279,196 | B2* | 5/2019 | West | A61N 5/1031 |
| 10,485,990 | B2* | 11/2019 | Willcut | A61N 5/1039 |
| 10,716,955 | B2* | 7/2020 | Kuang | A61N 5/1049 |
| 10,792,514 | B2* | 10/2020 | Ruokokoski | A61N 5/1038 |
| 10,799,716 | B2* | 10/2020 | Morgas | A61N 5/103 |
| 10,918,885 | B2* | 2/2021 | Haas | A61N 5/1037 |
| 11,238,580 | B2* | 2/2022 | Laaksonen | G06V 10/25 |
| 11,278,737 | B2* | 3/2022 | Peltola | G06F 17/10 |
| 11,410,352 | B2* | 8/2022 | Li | A61B 6/5211 |
| 11,524,178 | B2* | 12/2022 | Vija | G16H 30/40 |
| 11,562,482 | B2* | 1/2023 | Morgas | G06T 7/0012 |
| 11,654,300 | B2* | 5/2023 | Olcott | A61N 5/1001 378/65 |
| 11,707,223 | B2* | 7/2023 | Ramirez-Fort | A61N 5/0603 607/88 |
| 11,842,498 | B2* | 12/2023 | Laaksonen | A61N 5/1038 |
| 12,133,991 | B2* | 11/2024 | Andersson | A61N 5/1031 |
| 12,201,849 | B2* | 1/2025 | Da Silva Rodrigues | A61N 5/1031 |
| 12,364,394 | B2* | 7/2025 | Peck | A61N 5/1071 |
| 12,377,289 | B2* | 8/2025 | Pierce | A61N 5/1071 |
| 2010/0061607 | A1 | 3/2010 | Sgouros et al. | |
| 2011/0135058 | A1 | 6/2011 | Sgouros et al. | |
| 2020/0101319 | A1 | 4/2020 | Haas | |
| 2020/0121951 | A1 | 4/2020 | Morgas et al. | |
| 2021/0065360 | A1 | 3/2021 | Laaksonen et al. | |
| 2021/0069527 | A1 | 3/2021 | Peltola et al. | |
| 2021/0183070 | A1 | 6/2021 | Laaksonen et al. | |
| 2021/0228907 | A1 | 7/2021 | Olcott et al. | |
| 2021/0304402 | A1 | 9/2021 | Morgas et al. | |
| 2023/0107906 | A1 | 4/2023 | Ramirez-Fort et al. | |

OTHER PUBLICATIONS

Capala et al., "Dosimetry for radiopharmaceutical therapy: current practices and commercial resources", J Nucl Med; vol. 62, No. 12, Dec. 2021.

Dietrich et al., "Improving external beam radiotherapy by combination with internal irradiation", British Institute of Radiology, 2015.

Bellavia et al., "Combined targeted radiopharmaceutical therapy and immune checkpoint blockade: from preclinical advances to the clinic", Journal of Nuclear Medicine, Sep. 2, 2022.

Sgouros et al. "Radiopharmaceutical therapy in cancer: clinical advances and challenges", Nature Reviews, vol. 19, Sep. 2020.

Danieli et al., "Personalized dosimetry in targeted radiation therapy: a look to methods, tools and critical aspects", J. Pers. Med, Feb. 2, 2022.

Dickson et al., "EANM practice guideline for quantitative SPECT-CT", Eur. J. Nucl. Med. Mol. Imaging, Dec. 5, 2022.

Sgouros et al. "Tumor response to radiopharmaceutical therapies: the knowns and the unknowns", The Journal of Nuclear Medicine, vol. 62. No. 12, Dec. 2021.

Marin et al. "Theranostics in nuclear medicine: emerging and re-emerging integrated imaging and therapies in the era of precision oncology", Radiographics.rsna.org, Oct. 2020.

Kerr et al., "Developments in combining targeted radionuclide therapies and immunotherapies for cancer treatment", Pharmaceutics, Dec. 30, 2022.

Pang et al., "Medical imaging biomarker discovery and integration towards AI-based personalized radiotherapy", Frontiers in Oncology, Jan. 17, 2022.

Savjani et al. "A framework for sharing radiation dose distribution maps in the electronic medical record for improving multidisciplinary patient management", Radiology Imaging Cancer, 2021.

Mao et al. "Evaluation of auto-contouring and dose distributions for online adaptive radiation therapy of patients with locally advanced lung cancers", Practical Radiation Oncology, 2022.

Sarnelli et al., "Alpha-emitter radiopharmaceuticals and external beam radiotherapy: a radiobiological model for the combined treatment", MDPI, Feb. 21, 2022.

Extended European Search Report and European Search Opinion issued Jul. 16, 2024, in European Patent Application No. 24172577.9.

* cited by examiner

CLINICAL GOAL TEMPLATES

PTVs

| PTV8 | Phase 1 8.00 Gy | Goal Variation | D98.5 % ≥ 7.20 Gy D98.5 % ≥ 6.40 Gy | Priority | 1 |
|---|---|---|---|---|---|
| | | Goal Variation | V8.00 Gy ≥ 95.0 % V8.00 Gy ≥ 93.0 % | Priority | 1 |
| | | Goal Variation | D0.10 cm3 ≤ 110.0 % D0.10 cm3 ≤ 120.0 % | Priority | 1 |
| | | Goal Variation | V105.0 % ≤ 10.0 % V105.0 % ≤ 50.0 % | Priority | 4 |
| PTV12 | Phase 1 12.00 Gy | Goal Variation | D98.5 % ≥ 10.80 Gy D98.5 % ≥ 9.60 Gy | Priority | 1 |
| | | Goal Variation | V12.00 Gy ≥ 95.0 % V12.00 Gy ≥ 93.0 % | Priority | 1 |
| | | Goal Variation | D0.10 cm3 ≤ 110.0 % D0.10 cm3 ≤ 120.0 % | Priority | 1 |
| | | Goal Variation | V105.0 % ≤ 10.0 % V105.0 % ≤ 50.0 % | Priority | 4 |
| PTV15 | Phase 1 15.00 Gy | Goal Variation | D98.5 % ≥ 13.50 Gy D98.5 % ≥ 12.00 Gy | Priority | 1 |
| | | Goal Variation | V15.00 Gy ≥ 95.0 % V15.00 Gy ≥ 93.0 % | Priority | 1 |
| | | Goal Variation | D0.10 cm3 ≤ 110.0 % D0.10 cm3 ≤ 120.0 % | Priority | 1 |
| | | Goal Variation | V105.0 % ≤ 10.0 % V105.0 % ≤ 50.0 % | Priority | 4 |

FIG. 9

CLINICAL GOAL TEMPLATES

Organs

| | | | | | |
|---|---|---|---|---|---|
| 10Gy-Avoidance | Phase 1 | Goal | Dmean ≤ 1.00 Gy | Priority | 3 |
| | | Variation | Dmean ≤ 10.00 Gy | | |
| 20Gy-Avoidance | Phase 1 | Goal | Dmean ≤ 3.00 Gy | Priority | 3 |
| | | Variation | Dmean ≤ 15.00 Gy | | |
| 30Gy-Avoidance | Phase 1 | Goal | Dmean ≤ 5.00 Gy | Priority | 3 |
| | | Variation | Dmean ≤ 15.00 Gy | | |
| 40Gy-Avoidance | Phase 1 | Goal | Dmean ≤ 10.00 Gy | Priority | 3 |
| | | Variation | Dmean ≤ 15.00 Gy | | |
| Duodenum | Phase 1 | Goal | Dmean ≤ 0.50 Gy | Priority | 2 |
| | | Variation | Dmean ≤ 25.00 Gy | | |
| Kidney left | Phase 1 | Goal | Dmean ≤ 0.50 Gy | Priority | 2 |
| | | Variation | Dmean ≤ 25.00 Gy | | |
| Kidney right | Phase 1 | Goal | Dmean ≤ 0.50 Gy | Priority | 2 |
| | | Variation | Dmean ≤ 25.00 Gy | | |
| Liver | Phase 1 | Goal | Dmean ≤ 0.50 Gy | Priority | 2 |
| | | Variation | Dmean ≤ 30.00 Gy | | |
| Small bowel | Phase 1 | Goal | Dmean ≤ 0.50 Gy | Priority | 2 |
| | | Variation | Dmean ≤ 10.00 Gy | | |
| Spinal Cord | Phase 1 | Goal | D0.10 cm3 ≤ 5.00 Gy | Priority | 2 |
| | | Variation | D0.10 cm3 ≤ 10.00 Gy | | |
| | | Goal | Dmean ≤ 0.50 Gy | Priority | 4 |
| | | Variation | Dmean ≤ 5.00 Gy | | |
| Stomach | Phase 1 | Goal | Dmean ≤ 0.50 Gy | Priority | 2 |
| | | Variation | Dmean ≤ 25.00 Gy | | |

FIG. 10

FIG. 16
Reference Image
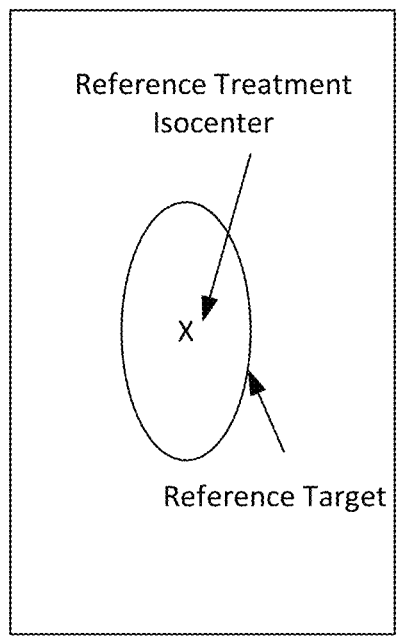
Treatment Session Image
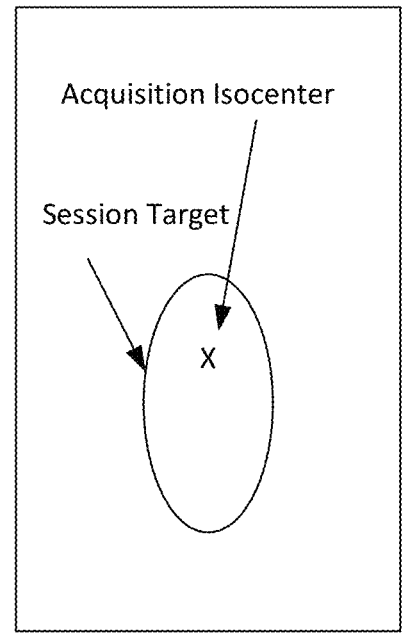
Initial Alignment-Patient Treated at Acquisition Isocenter
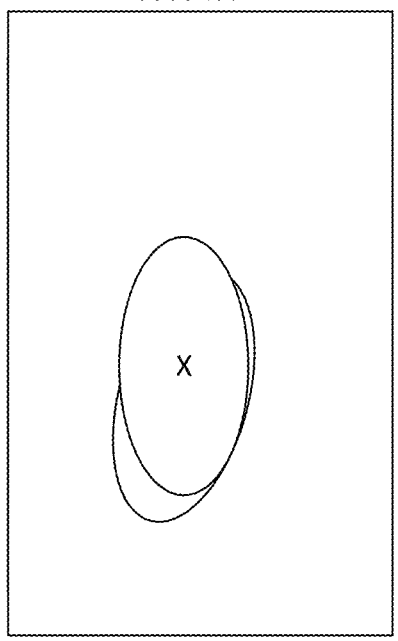
Targets Aligned Automatically
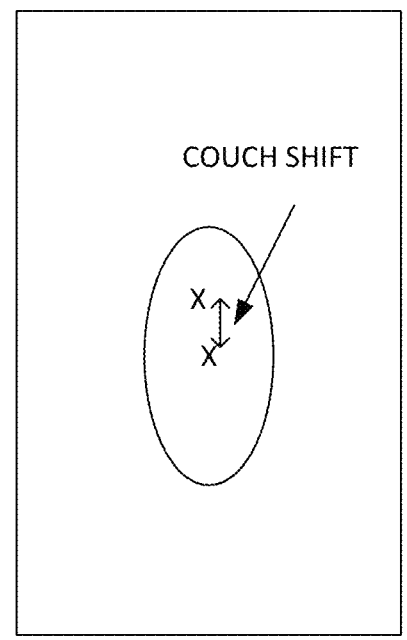

FIG. 18
REFERENCE PLAN
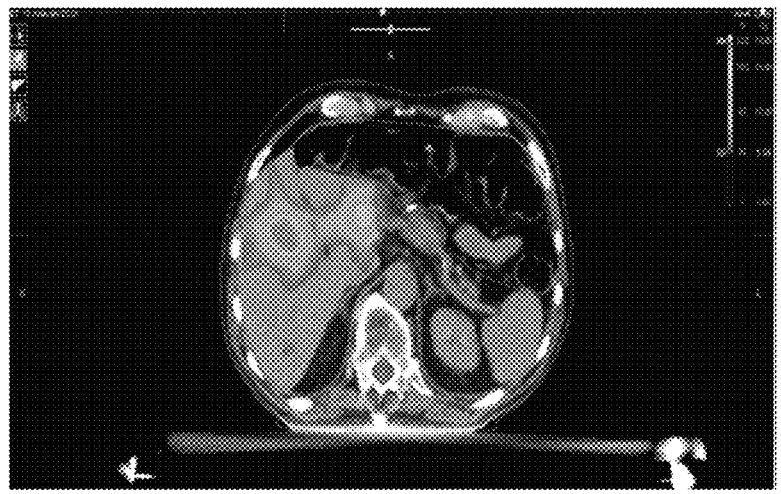
SCHEDULED PLAN
ADAPTED PLAN

INTERNAL DOSE-ADAPTED AUTOMATED EXTERNAL BEAM RADIATION THERAPY

FIELD

The present disclosure relates generally to dual modality radiotherapeutic treatment protocols, and more particularly, to systems, methods, and devices for internal dose adapted automated external beam radiation therapies. The present disclosure also relates to systems, methods, and devices for incorporating dosimetric data obtained in internal radiation therapies to guide automated adaptive workflows of external beam radiation therapies.

BACKGROUND

External radiation beam therapy (ERBT) involves medical procedures that use external radiation beams to treat pathological anatomies (tumors, lesions, vascular malformations, nerve disorders, etc.) by delivering prescribed doses of radiation (X-rays, gamma rays, electrons, protons, and/or ions) to the pathological anatomy, while minimizing radiation exposure to the surrounding tissue and critical anatomical structures.

In general, (EBRT) treatments consist of several phases. First, a precise three-dimensional (3D) map of the anatomical structures in the area of interest (head, body, etc.) is constructed using any one of (or combinations thereof) a computed tomography (CT), cone-beam computed tomography (CBCT), magnetic resonance imaging (MRI), positron emission tomography (PET), 3D rotational angiography (3DRA), or ultrasound techniques. This determines the exact coordinates of the target within the anatomical structure, namely, locates the tumor or abnormality within the body and defines its exact shape and size. Second, a motion path for the radiation beam is computed to deliver a dose distribution that the radiation oncologist finds acceptable, considering a variety of medical constraints. During this phase, a team of specialists develop a treatment plan using special computer software to optimally irradiate the tumor and minimize dose to the surrounding normal tissue by designing beams of radiation to converge on the target area from different angles and planes. Third, the radiation treatment plan is executed. During this phase, the radiation dose is delivered to the patient according to the prescribed treatment plan. Generally, a treatment plan is delivered to the patient over a series of radiation treatments referred to as fractions.

There are many factors that can contribute to differences between the prescribed radiation dose distribution and the actual dose delivered (i.e., the actual dose delivered to the target during the radiation treatment). One such factor is uncertainty in the patient's position in the radiation therapy system. Other factors involve uncertainty that is introduced by changes that can occur during the patient's treatment. Such changes can include random errors, such as small differences in a patient's setup position. Other sources are attributable to physiological changes that might occur if a patient's tumor regresses or if the patient loses weight during therapy. Another category of uncertainty includes motion. Motion can potentially overlap with either of the categories as some motion might be more random and unpredictable, whereas other motion can be more regular.

These anatomical and physiological changes can cause the target volumes (i.e., targets to be irradiated) and surrounding anatomical structures and organs to move and change in size and shape during the therapy. As such, continuing to follow the initial treatment plan may result in an actual received dose distribution that differs from the planned distribution, and thus reduced doses to target volumes and/or increased doses to organs at risk (OARs), which can ultimately result in deleterious patient outcomes. Adapting the treatment plan, namely, making modifications to the initial treatment plan to match the new location and shape of the target volume and surrounding anatomical structures based on subsequently acquired image data is one way to rectify this issue.

Adaptive radiation therapy is a process by which, using subsequent images, an original treatment plan can be adjusted to counteract these anatomical changes. The adaptive radiation therapy process is a closed-loop radiation treatment process where the treatment plan can be modified using a systematic feedback of measurements. By systematically monitoring treatment variations and by incorporating them to re-optimize the treatment plan during the course of treatment, the adaptive radiation therapy improves radiation treatment.

Adaptive radiation therapy can occur at three different timescales, namely, off-line between treatment fractions, on-line immediately prior to a treatment fraction, and in real-time during a treatment fraction.

In an off-line adaptive therapy process, during each treatment fraction, a new image (CT or CTBC image, for example) of the patient is acquired before or after each of the fractions and the images are evaluated to determine multi-day locations of the target volumes. Based on this, a new plan can be developed to better reflect the range of motion of the target volumes.

In an on-line (on-couch) real-time adaptive therapy process, the radiation therapy system can be used prior to a fraction to validate or adjust the patient treatment plan for the treatment delivery. The imaging system can thus be used to concurrently modify the treatment delivery to reflect the changes in the patient's anatomy.

In the on-couch adaptive therapy process, the radiation therapy system can also be used during a treatment fraction. On-couch adaptive radiation therapy allows adjustment of treatment plan based on tumor and anatomical changes while the patient is on the treatment table.

The on-couch adaptive radiation therapy can also allow for recalculating the delivered dose after each fraction and accumulate these doses utilizing image and dose deformation techniques during the accumulation to account for internal motions. The calculated doses can then be compared to an initial planned dose, and if any discrepancies are noted, subsequent fractions can be modified to account for the changes.

Internal radiation therapies are medical procedures that use internal radiation beams to treat pathological anatomies by delivering the radiation using radioactive isotopes, such as radiopharmaceutical agents or radiotracers, linked to specific molecules. Radiopharmaceutical agents are used to target diseased tissue with radiation applied at the cellular level by way of way of a specific chemical and/or biologic affinity. Radiopharmaceuticals can be injected intravenously or through intra-arterial or oral access and can reach the tumoral site by molecular radiation therapy (MRT) or selective intra-arterial radiation therapy (SIRT). MRT uses the natural tropism of a radionuclide or a vector molecule selected according to biochemical properties of the disease so that the radiopharmaceutical binds preferentially to the target cells. SIRT, on the other hand, exploits tumor vascularization. In SIRT, the radiopharmaceutical is directly injected, in the form of microspheres, into the tumor arterial blood circle and no active molecule is needed.

The imaging or therapeutic capability of each radioisotope is determined according to the type of radiation emitted. For example, low linear energy transfer (LET) radioisotopes emitting electromagnetic radiation (i.e., 18F fluorodeoxyglucose (FDG), which emits gamma rays during positronic decay) can be used for imaging because the electromagnetic radiation can be detected by imaging systems (PET, single-photon emission computed tomography (SPECT), CT, etc.), and high LET radioisotopes emitting particulate radiation (i.e., a/B particles) can be used for therapy because they have cytotoxic (i.e., therapeutic) properties.

Some radioisotopes (lutetium 177, for example) can emit both electromagnetic and particulate radiation, making simultaneous treatment and imaging possible. Diagnostic and therapeutic radiopharmaceuticals that access the same cellular structure and biologic process (i.e., they share the same target) are considered theranostic pairs, with theranostics being the coupling of diagnostic and therapeutics tools related to the same molecular targets.

The measure by which the efficacy and toxicity of the internal radiation treatment is evaluated is the absorbed dose, since it is the physical quantity by which the damage to the targeted cells and normal organs through the emitted radiation is being evaluated.

Administration of internal radiation therapies are either by fixed activity, where all patients receive the same administered dose, by maximum tolerated dose, where patients receive an individualized administered activity projected to deliver the maximum tolerated absorbed dose to the normal tissue, or prescribed tumor absorbed dose, where patients receive an individualized administered activity projected to deliver a specified therapeutic absorbed dose to the tumor or target tissue. Patient specific and prescribed tumor dose approaches typically require a series of pretherapy measurements to derive the administered activity to deliver the correct dose. After the treatment, post-therapy dosimetry is performed to verify the delivered absorbed dose.

Thus, internal radiation therapies and external beam radiation therapies are radiation treatment modalities that cause different biological effects in the patient resulting from their dissimilar modes of administration, dose-rates, dose distributions and molecular mechanisms of cytotoxicity. EBRT is generally used for debulking a dominant tumor, whereas internal radiation therapy is used for controlling the dominant tumor while simultaneously eradicating smaller widespread deposits.

Although there is recognition that combining the two radiation treatment modalities would be beneficial to the patient, currently there is a lack of dosimetric framework that relates the spatio-temporal pattern and amount of energy deposited by each treatment modality to the total biological effect of the two together.

There is thus a need to provide a framework by which the dosimetric data from an internal radiation treatment can be incorporated into the treatment planning, treatment adaptation, and safe treatment delivery of an external beam radiation therapy.

SUMMARY

Embodiments of the disclosed subject matter enable seamless implementation of the dosimetric data obtained from internal radiation treatment protocols (i.e., internal dosimetric data) into external beam radiation treatment protocols.

Embodiments of the disclosed subject matter further enable the use of the internal dosimetric data in the planning of the treatment for an external beam radiation treatment protocol.

Embodiments of the disclosed subject matter further provide a framework that allows for the internal dosimetric data to be incorporated into an automated workflow of an adaptive radiation treatment protocol.

Embodiments of the disclosed subject matter further provide for the automated adaptive workflow to adapt a treatment plan generated using the internal dosimetric data to the anatomy of the patient at every fraction while the patient is on the treatment couch.

In disclosed embodiments, a radiation treatment method comprises sequentially exposing a patient to a dual modality radiation protocol, the dual modality radiation protocol including: an internal radiation protocol, and an external beam radiation protocol, the internal radiation protocol including: administering a radiopharmaceutical to the patient; and generating a dosimetric image of the radiopharmaceutical activity distribution within the patient; and the external beam radiation protocol including implementing an automated workflow to: generate a radiation treatment plan based on the dosimetric image data; adapt the radiation treatment plan for a current treatment session; and deliver the adapted treatment plan to the patient.

The internal radiation protocol is a protocol that may be included in one of a radioactive systemic therapy, radioembolic radiation treatment, radiolabeled chemotherapy, radiolabeled immunotherapy, or radiolabeled targeted radiation therapy.

The external beam radiation protocol may be an on-couch adaptive radiotherapy protocol, and the automated workflow is an automated adaptive workflow.

In disclosed embodiments, a method for generating of the radiation treatment plan comprises: using the internal dosimetric image to generate a reference patient model; and selecting a set of planned clinical goals for the reference patient model as input to a plan generation and optimization algorithm, wherein the plan generation and optimization algorithm derives objectives for the planned clinical goals and generates a reference treatment plan that fulfills the derived objectives.

In disclosed embodiments, a method of adapting the radiation treatment plan for a current treatment session comprises: using a set of directives to perform a series of automated steps to: generate a treatment session patient model; generate a first treatment plan and a second treatment plan for the session patient model; and select a treatment plan that is appropriate for the current treatment session.

Embodiments further include a method for generating a treatment plan for an external beam radiation therapy, comprising: obtaining an internal dosimetric map derived from a SPECT/CT or PET/CT image from an internal radiation treatment system indicating radiopharmaceutical uptake within a patient; automatically converting the radiopharmaceutical uptake into targets to be irradiated and targets to be avoided; applying an automated contouring process to generate target structures on a reference image, the target structures representing contours to be irradiated and contours of the targets to be avoided, the reference image being the CT image used to obtain the dosimetric SPECT/CT or PET/CT image; and selecting a set of planned clinical goals for the target structures as an input to a plan generation and optimization algorithm to automatically derive objectives for the planned clinical goals and generate a reference treatment plan that fulfills the derived objectives.

Embodiments further include a system for implementing an automated workflow for an adaptive radiation therapy session of a patient, comprising: a computer processing system configured to: obtain a set of directives, the set of directives including information representing a planned treatment plan for the patient; and using the set of directives, perform a series of automated steps to: generate a session patient model; and generate an adapted treatment plan for the session patient model, wherein the planned treatment plan is generated based on dosimetric SPECT/CT or PET/CT-derived image data indicating radiopharmaceutical uptake within the patient.

An adaptive therapy workflow for generating a session patient model and selecting a treatment plan for the treatment session is also disclosed, the workflow, comprising: obtaining a set of directives, the directives including information relating to a planned treatment of a patient; using the set of directives to guide the adaptive workflow to generate a session patient model in a step-wise fashion starting with the most variable anatomy; using directives from the set of directives to continuously and automatically optimize a treatment plan generated for the session model thereby obtaining an adapted plan for the treatment session; using the generated session model to automatically transfer control points of the planned treatment thereby generating a scheduled plan for the treatment session; and using directives from the set of directives to allow a user to select the treatment plan appropriate for the treatment session.

An adaptive therapy workflow for generating an adapted treatment plan for the session patient model that does not need generating a synthetic image data for the patient is also disclosed.

A system configured to perform the method steps as disclosed herein is also disclosed.

A system including a computer processing device configured to execute a sequence of programmed instructions embodied on a computer-readable storage medium, the execution thereof causing the system to execute the method steps disclosed herein is also disclosed.

A non-transitory computer-readable storage medium upon which is embodied a sequence of programmed instructions for the generation of a reference treatment plan based on internal dosimetric information from an internal radiation protocol and the generation of day to day treatment images to be used in adaptive radiation therapy, and a computer processing system that executes the sequence of programmed instructions embodied on the computer-readable storage medium are also disclosed. Execution of the sequence of programmed instructions can cause the computer processing system to execute the adaptive workflow described herein.

Objects and advantages of embodiments of the disclosed subject matter will become apparent from the following description when considered in conjunction with the accompanying drawings.

BRIEF DESCRIPTION OF DRAWINGS

FIGS. 9-10 are illustrations of clinical goal template available for the user, according to various embodiments of the disclosed subject matter.

FIG. 16 is a process flow diagram for determining a treatment isocenter, according to various embodiments of the disclosed subject matter.

FIGS. 18-19 illustrate screen shots of treatment plan, treatment dose, and treatment isodose verification process display.

DETAILED DESCRIPTION

Figure 1A:
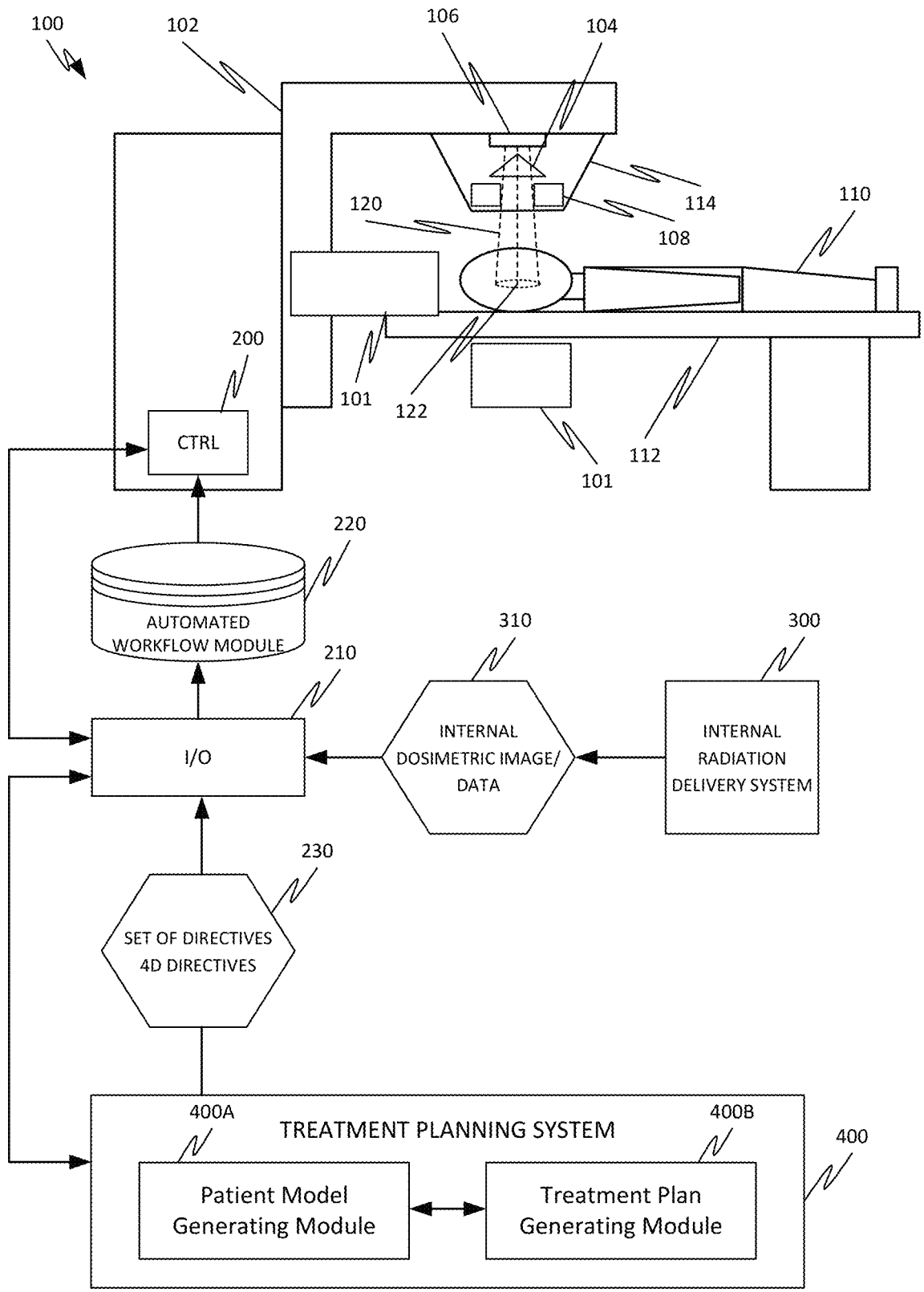
FIGS. 1A and 1B are simplified schematic diagrams of an external beam radiation therapy system, according to various embodiments of the disclosed subject matter.
Figure 1B:
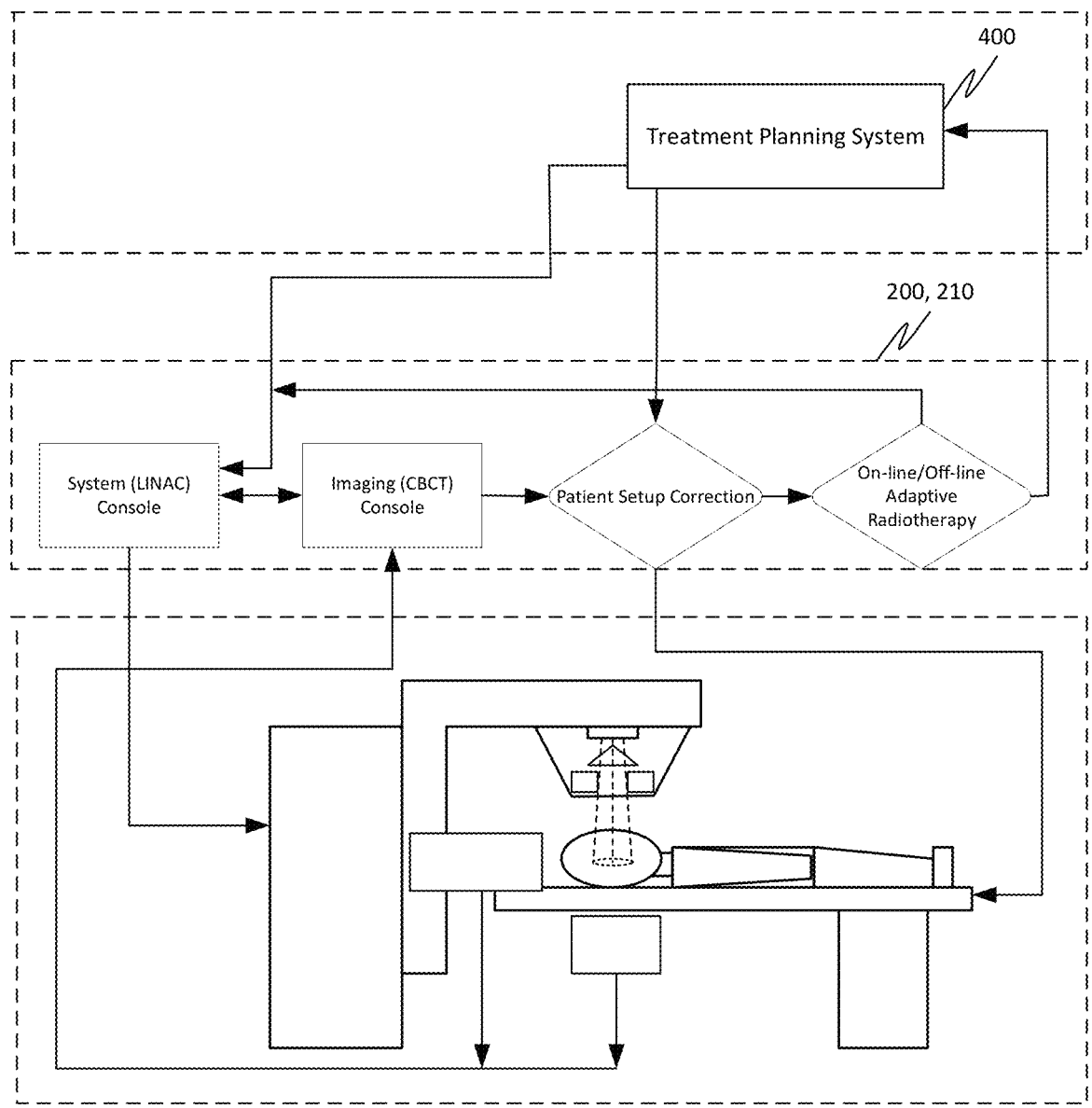
Figure 2:
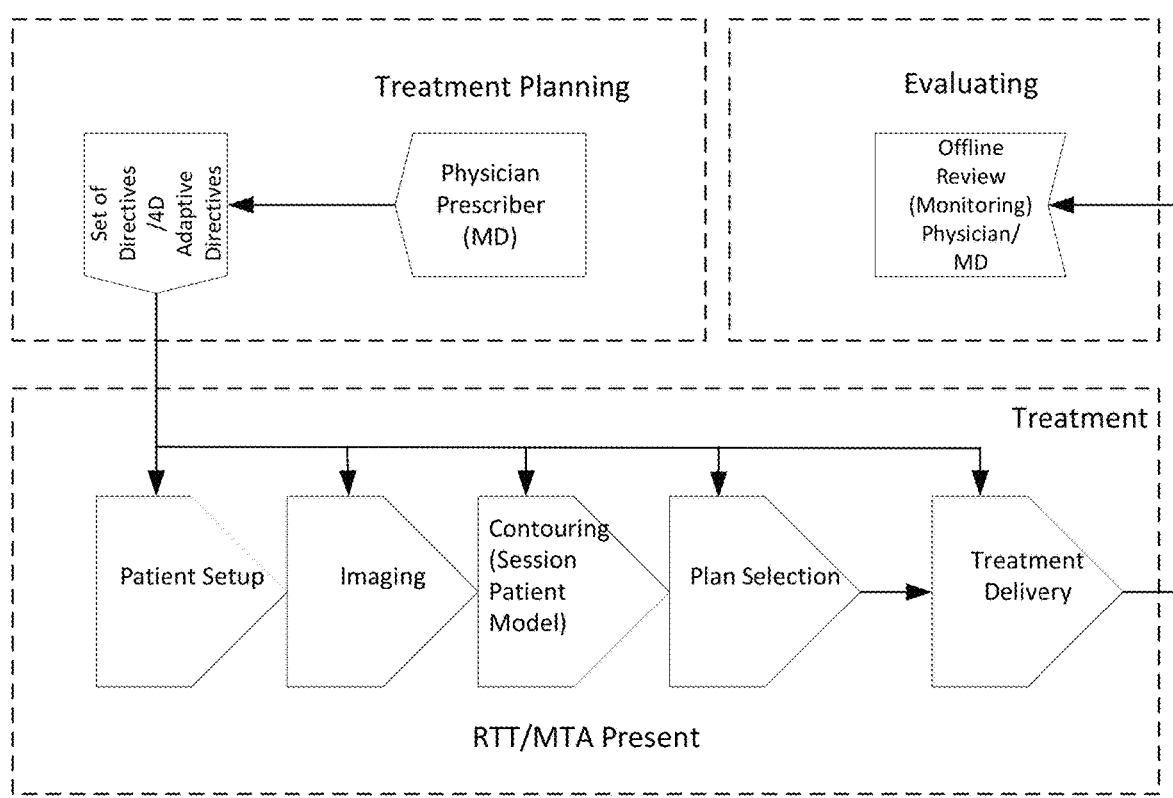
FIG. 2 is a simplified illustration for using the external beam radiation therapy system of FIGS. 1A and 1B for on-couch adaptive radiation therapy, according to various embodiments of the disclosed subject matter.

Referring to FIGS. 1A and 1B, an exemplary external beam radiation therapy (EBRT) system 100 is shown that is configured to be used in an adaptive external radiation beam protocol as shown in FIG. 2. The (EBRT) system 100 can provide radiation to a patient 110 positioned on a treatment couch 112 and can allow for the implementation of various radiation dose verification protocols. The radiation therapy can include photon-based radiation therapy, particle therapy, electron beam therapy, or any other type of treatment therapy.

In an embodiment, the (EBRT) system 100 can include a radiation treatment device 101 such as, but not limited to, a LINAC operable to generate one or more beams of megavolt (MV) X-ray radiation for treatment. The LINAC may also be operable to generate one or more beams of kilovolt (kV) X-ray radiation, for example, for patient imaging. The (EBRT) system 100 has a gantry 102 supporting a radiation treatment head 114 with one or more radiation sources 106 and various beam modulation elements, such as, but not limited to, flattening filter 104 and collimating components 108. The collimating components 108 can include, for example, a multi-leaf collimator (MLC), upper and lower jaws, and/or other collimating elements. The collimating components 108 and/or the flattening filter 104 can be positioned within the radiation beam path by respective actuators (not shown), which can be controlled by a controller.

The gantry 102 can be a ring gantry (i.e., it extends through a full 360° arc to create a complete ring or circle), but other types of mounting arrangements may also be employed. For example, a static beam, or a C-type, partial ring gantry, or robotic arm can be used. Any other framework capable of positioning the treatment head 114 at various rotational and/or axial positions relative to the patient 110 may also be used.

In an embodiment, the radiation therapy device 101 is a MV energy intensity modulated radiation therapy (IMRT) device. The intensity profiles in such a system are tailored to the treatment requirements of the individual patient. The IMRT fields are delivered with MLC 108, which can be a computer-controlled mechanical beam shaping device attached to the head 114 and includes an assembly of metal fingers or leaves. For each beam direction, the optimized intensity profile is realized by sequential delivery of various subfields with optimized shapes and weights. From one subfield to the next, the leaves may move with the radiation beam on (i.e., dynamic multi-leaf collimation (DMLC)) or with the radiation beam off (i.e., segmented multi-leaf collimation (SMLC)).

Alternatively, or additionally, the radiation therapy device 101 can be a tomotherapy device where intensity modulation is achieved with a binary collimator (not shown) which opens and closes under computer control. As the gantry 102 continuously rotates around the patient 110, the exposure time of a small width of the beam can be adjusted with opening and closing of the binary collimator, allowing radiation 120 to be directed to a portion of the body of the patient 110 and delivered to a region of interest 122 through the most desirable directions and locations of the patient 110. The region of interest is a two-dimensional area and/or a three-dimensional volume that is desired to receive the radiation and it may be referred to as a target or target region or target volume. Another type of region of interest is a region of risk. If a portion includes a region of risk, the radiation is diverted from the region of risk. The patient 110 may have more than one target region that needs to receive radiation therapy.

Alternatively, or additionally, the radiation therapy device can be a volumetric modulated arc therapy (VMAT) device. In effect, any type of IMRT device can be employed as the radiation therapy device 101 of the EBRT system 100, and can also include an on-board volumetric imaging, which can be used to generate in-treatment image data generated during a treatment session.

For example, embodiments of the disclosed subject matter can be applied to image-guided radiation therapy (IGRT) devices, which uses cross-sectional images of a patient's internal anatomy taken during the radiation therapy treatment session (i.e., in-treatment images) to provide information about the patient's position. Frequent two or three-dimensional imaging during the radiation treatment is used to direct the therapeutic radiation utilizing the imaging coordinates of the actual radiation treatment plan. This ensures that the patient is localized in the radiation treatment system in the same position as planned, and that the patient is properly aligned during the treatment. Although, the IGRT process involves conformal radiation treatment guided by specialized imaging tests taken during the planning phase, it does rely on the imaging modalities from the planning process as the reference coordinates for localizing the patient 110 during treatment. Thus, associated with each image-guided radiation therapy system is an imaging system to provide in-treatment (treatment session) images that are used to set-up the radiation delivery procedure.

In-treatment images can include one or more two or three-dimensional images (typically X-ray) acquired at one or more different points during treatment. There are a variety of ways to acquire in-treatment images. In certain approaches, distinct independent imaging systems and/or imaging methods are used for acquiring pre-treatment and in-treatment images, respectively. For example, a 3D IGRT could include localization of a cone-beam computed tomography (CBCT) dataset with a planning computed tomography (CT) dataset, and a 2D IGRT could include matching planar kilovoltage (kV) radiographs or megavoltage (MV) images with digital reconstructed radiographs (DRRs) obtained from the planning CT.

Another approach is to use portal imaging systems. In portal imaging systems, a detector is placed opposite the therapeutic radiation source to image the patient for setup and in-treatment images. Another approach is X-ray tomosynthesis which is an in-treatment imaging modality for use in conjunction with radiation treatment systems.

Alternatively, the (EBRT) system 100 can include a kilovoltage or a megavoltage detector operable to receive the radiation beam 120. The radiation therapy device 101 and the detector can operate as a computed tomography (CT) system to generate CT images of the patient. The images can illustrate the patient's body tissues, organs, bone, soft tissues, blood vessels, etc.

Each type of radiation therapy device can be accompanied by a corresponding radiation plan and radiation delivery procedure.

As shown in FIG. 1B, the controller 200, which can be, but is not limited to, a graphics processing unit (GPU), can include a computer with appropriate hardware such as a processor, and an operating system for running various software programs and/or communication applications. The controller 200 can include software programs that operate to communicate with the radiation therapy device 101, which software programs are operable to receive data from external software programs and hardware. The computer can also include any suitable input/output (I/O) devices 210, which can be adapted to allow communication between controller 200 and a user of the (EBRT) system 100, e.g., medical personnel. For example, the controller 200 can be provided with I/O interfaces, consoles, storage devices, memory, keyboard, mouse, monitor, printers, scanner, as well as a departmental information system (DIS) such as a communication and management interface (DICOM) for storing and transmitting medical imaging information and related data and enabling the integration of medical imaging devices such as scanners, servers, workstations, printers, network hardware, etc.

Alternatively, or additionally, the I/O devices 210 can provide access to a network (not shown) for transmitting data between controller 200 and remote systems. For example, the controller 200 can be networked via I/O 210 with other computers and radiation therapy systems, including an internal radiation delivery system 300, for receiving dosimetric images and dosimetric image data 310, for example, from the internal radiation delivery system 300. The EBRT system 100, the radiation treatment device 101, and the controller 200 can communicate with a network as well as databases and servers, for example, a dose calculation server (e.g., distributed dose calculation framework) and a treatment planning system 400. The controller 200 may also be configured to transfer medical image related data between different pieces of medical equipment.

The EBRT system 100 can also include a plurality of modules, including an automated workflow module 220, containing programmed instructions (e.g., as part of controller 200, or as separate modules within the EBRT system 100, or integrated into other components of the EBRT system 100), which instructions cause the EBRT system 100 to perform different functions related to adaptive radiation therapy or other radiation treatment, as discussed herein, when executed. For example, the EBRT system 100 can include a treatment plan generating module 400B operable to generate the treatment plan for the patient 110 based on a plurality of data input to the EBRT system 100 by the medical personnel, a patient positioning module operable to position and align the patient 110 with respect to a desired location, such as the isocenter of the gantry, for a particular radiation therapy treatment, an image acquiring module operable to instruct the EBRT system 100 and/or the imaging device 101 to acquire images of the patient 110 prior to the radiation therapy treatment (i.e., anatomic images for treatment planning and patient positioning) and/or during the radiation therapy treatment (i.e., treatment session images), and to instruct the EBRT system 100 and/or the imaging device 101 or other imaging devices or systems to acquire images of the patient 110.

The EBRT system 100 can further include a dose calculation module operable to calculate the actual dose delivered to the patient 110 during radiation therapy treatment, a treatment delivery module operable to instruct the radiation therapy device 100 to deliver the treatment plan to the patient 110, a correlation module operable to correlate the planning images with the in-treatment images obtained during radiation therapy, a computation module operable to reconstruct three-dimensional target volumes from in-treatment images, an analysis module operable to compute displacement measurements, and a feedback module operable to instruct the controller in real-time to stop radiation therapy based on a comparison of the calculated displacement with a predetermined threshold value (range).

The EBRT system 100 can further include one or more contour generation modules operable to generate contours of target volumes and other structures in pre-treatment (planning, reference) and in-treatment (treatment session) images, an image registration module operable to register pre-treatment images with subsequent in-treatment images, a dose calculation module operable to calculate accumulated dose, a contour propagation module operable to propagate a contour from one image to another, a contour verification module operable to verify a generated contour, a registration deformation vector field generation module operable to determine deformation vector fields (DVFs) as a result of an image deformation process. The EBRT system 100 can further include modules for electron density map generation, isodose distribution generation, dose volume histogram (DVH) generation, image synchronization, image display, treatment plan generation, treatment plan optimization, automatic optimization parameter generation, updating and selection, and adaptive directives and treatment information transfer. The modules can be written in the C or C++ programming language, for example. Computer program code for carrying out operations as described herein may be written in any programming language, for example, C or C++ programming language.

Figure 3:
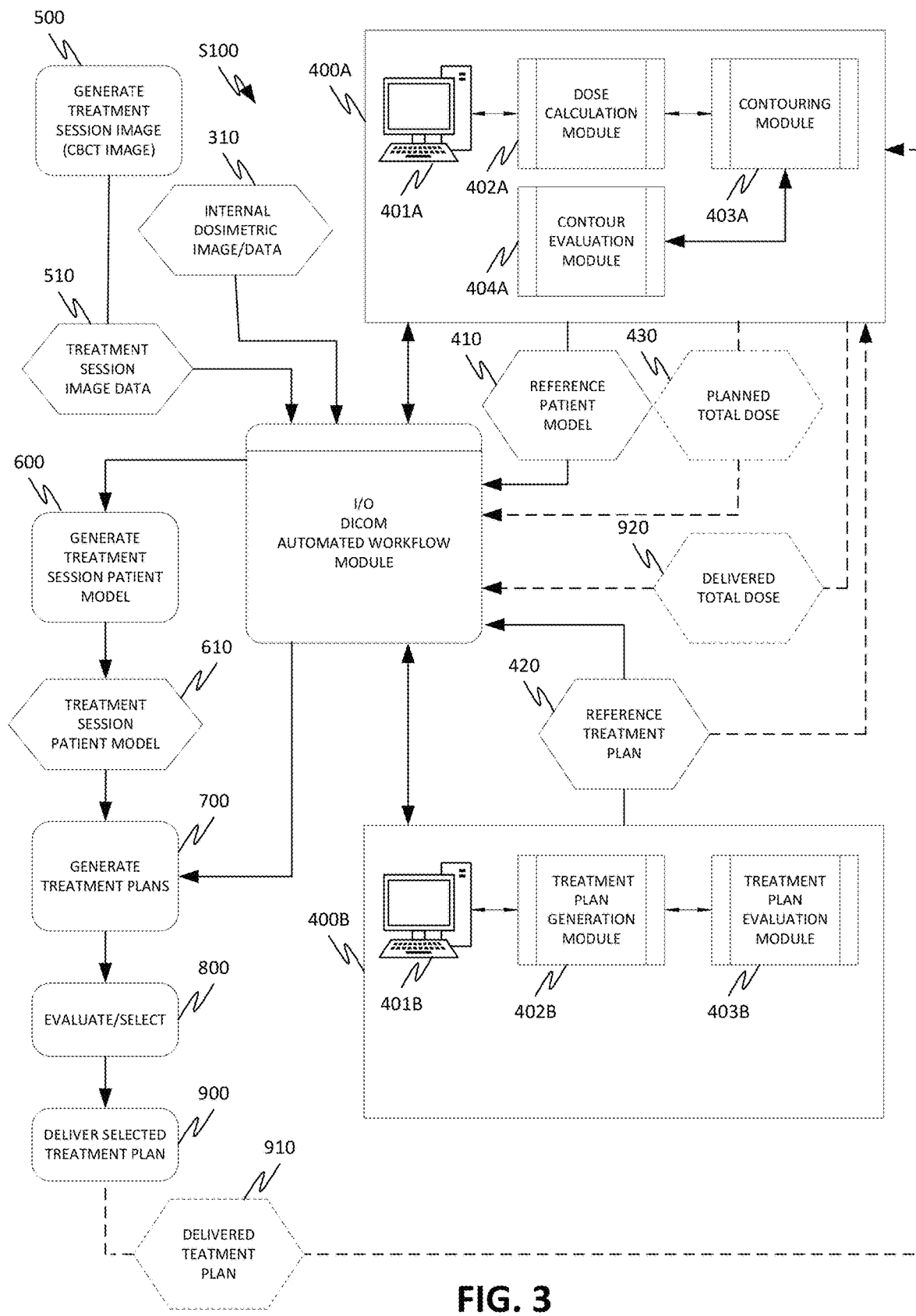
FIG. 3 is a workflow diagram for use in on-couch adaptive radiation therapy, according to various embodiments of the disclosed subject matter.

FIG. 3 illustrates an automated workflow S100, implemented via module 220 of the EBRT system 100, to seamlessly integrate internal radiation treatment dosimetric data 310 into an on-couch adaptive radiation treatment protocol (shown in FIG. 2).

Internal dosimetric image/data 310 is obtained from an internal radiation treatment protocol implemented in the internal radiation delivery system 300 via the I/O 210. The internal dosimetric image/data 310 is made available to the EBRT system 100 via the I/O 210 or DICOM or the imaging console. The internal dosimetric image/data 310 may also be generated by distinct independent imaging systems and/or imaging methods and/or imaging/image generating software, and communicated to the EBRT system 100 via the I/O 210 connections to other networks, databases and servers that allow for the implementation and transfer of medical image/medical image data.

The internal radiation treatment protocol could be a treatment protocol for any one of a radioactive systemic therapy, a radio-embolic radiation treatment, radiolabeled chemotherapy, radiolabeled immunotherapy, and radiolabeled targeted radiation therapy.

Figures 4, 5:
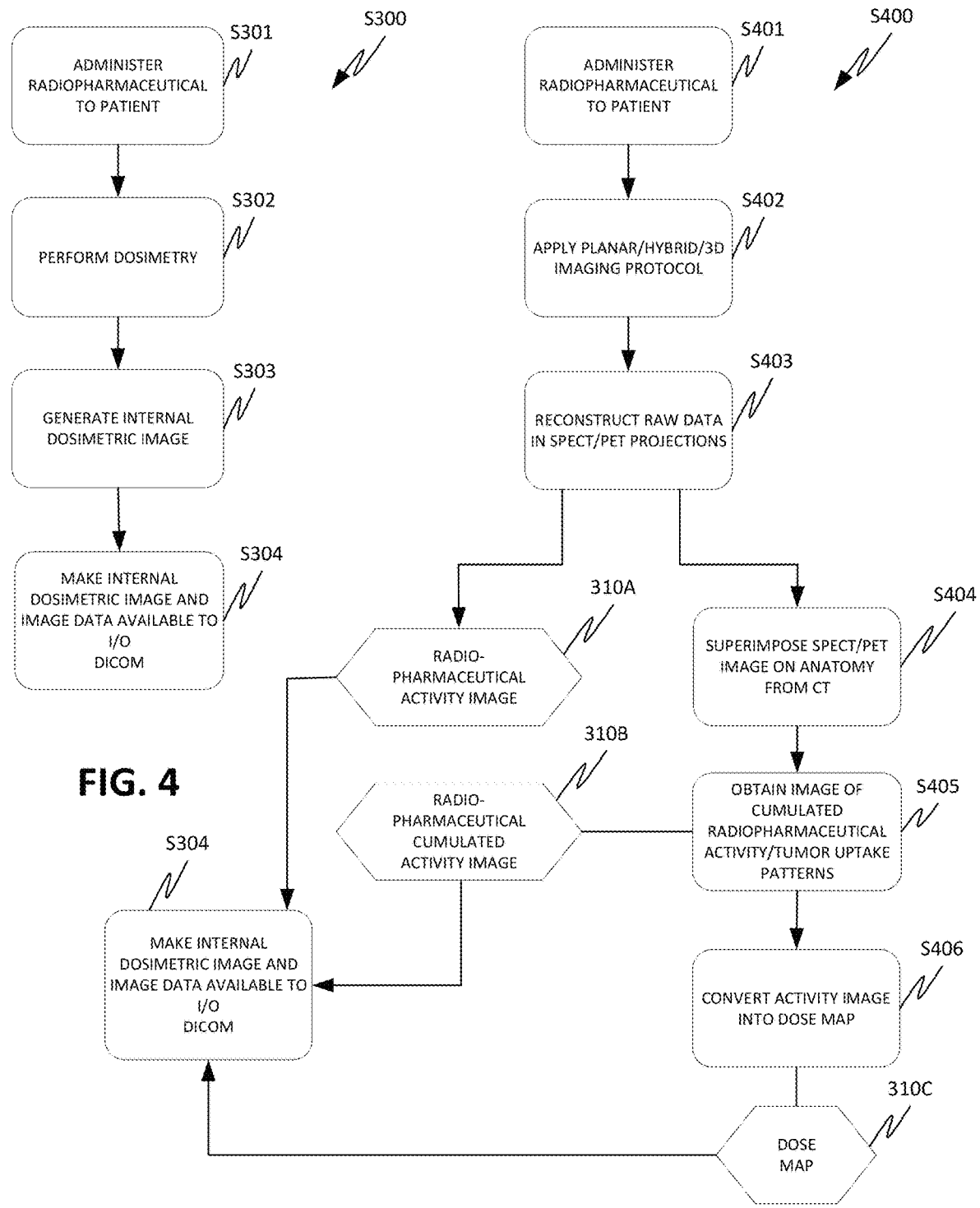
FIGS. 4-5 are process flow diagrams for generating internal dosimetric image/data in an internal radiation protocol, according to various embodiments of the disclosed subject matter.

In the exemplary internal radiation protocol S300 shown in FIG. 4, the patient 110 is administered a radiopharmaceutical agent (S301). Different radiopharmaceutical agents can be used, depending on the disease to be treated and the type of therapeutic application. For example, $^{131}$I could be used for treatment of thyroid diseases or cancers, ($^{131}$) mIBG for treatment of neuroblastoma, $^{90}$Y-DOTATOC for treating PRRT for NET and other somatostatin receptor expressing tumors, $^{90}$Y resin or glass microspheres or $^{166}$Ho ply-L-lactic acid microspheres for radioembolization of primary and secondary liver tumors, $^{90}$Y-MoAbs for radioimmunotherapy for hematologic malignancies (leukemia, MDS, myeloma, lymphoma), $^{177}$Lu-PSMA for treatment of prostate cancer, $^{223}$Ra for bone metastases from breast and prostate cancers, etc. This list is not exhaustive. It is to be understood that the dual modality radiation protocols described herein are applicable to any internal radiation protocols/treatments/therapies currently existing or developed in the future using radiopharmaceutical agents currently existing or developed in the future, including, but not limited to, radioactive systemic therapy protocols, radioembolic radiation treatment protocols, radiolabeled chemotherapy protocols, radiolabeled immunotherapy protocols, and any other radiolabeled targeted therapy protocols.

Dosimetry is next performed in S302 to assess the radiopharmaceutical activity distribution in the body of the patient. Dosimetry can be performed at different stages of the internal radiation protocol depending on the radiopharmaceutical, the number of treatment cycles, as well as the type of radiation treatment.

In cases where the radiopharmaceutical itself presents an emission channel or a paramagnetic component that can be used for tracking the substance with an imaging system (planar scintigraphy, SPECT, PET, MRI, etc.), the treatment usually consists of a single administration, and dosimetry is usually performed before therapy (i.e., diagnosis phase) by administering a tracer activity (i.e., low amount of the radiopharmaceutical).

In cases where multiple cycles are planned, and the radiopharmaceutical is suitable for imaging, dosimetry can be performed during the therapy, at the first and/or subsequent cycles.

In cases where the radiopharmaceutical is not suitable for imaging, a surrogate radiopharmaceutical can be used for dosimetry. The surrogate radiopharmaceutical has a physical half-life compatible with the biological half-life of the vector and has similar chemical properties.

Dosimetry can also be performed after treatment (i.e., post-treatment dosimetry).

Generally, dosimetry in an internal radiation treatment protocol involves a calibration step, a patient image acquisition step, a reconstruction/correction step, a registration and correction step, a cumulated activity step, and an absorbed dose calculation step.

The calibration and imaging steps are interconnected and include preparing the proper radiopharmaceutical and selecting and applying the proper imaging method. Based on the treatment, planar, hybrid and 3D dosimetry protocols may be employed. In a planar protocol, sequential whole-body 2D images are taken, which enables the calculation of the mean absorbed dose to organs or lesions. In order to be able to determine the absorbed dose at the voxel level, i.e., to obtain dose maps, one additional SPECT/CT or PET/CT image can be acquired at one of the timepoints to qualify the activity and then combine it with the activity variations versus time derived from the serial planar images (i.e., hybrid protocol). As another option, multiple SPECT/CTs or PET/CTs can be used (i.e., 3D protocol) for complete 3D information.

The reconstruction/correction step leads from raw acquisition (counts) from the images to activity in pixels/voxels composing the images. It is possible to derive activity images at the end of this step by employing a calibration factor.

By segmenting and registering the images acquired at different time-points, the registration and correction step allows for the estimation of the activity in regions or volumes of interest. This can lead to the quantification of activity present in the patient in various organs/regions/tissues of interest or at the voxel level at different time-points.

From this, the cumulated activities (i.e., time-integrated activities) can be derived using different extrapolation methods, such as the time-integrated activity (TIA) or the time-integrated activity coefficient (TIAC) method.

The absorbed dose calculation step can be performed in different ways, such as, by using precomputed values (S values from specific absorbed fraction estimations) or by implementing different absorbed dose calculation algorithms. From this, absorbed doses, absorbed dose maps and absorbed dose-volume histograms can be obtained.

The internal dosimetric image/data 310 that can be used in process S100 can be any dosimetric image/data generated through the dosimetric process S300 for a particular internal radiation treatment protocol, including dosimetric data obtained at a diagnostic, therapy, or post-therapy phase of the internal radiation treatment. The internal dosimetric image S303 and associated dosimetric data are made available to the I/O 210 of the EBRT system 100 in S304.

FIG. 5 illustrates and exemplary internal radiation treatment dosimetric process S400 where, after the administering of a radiopharmaceutical to the patient S401, one of a planar, hybrid or 3D imaging protocol is applied (S402) to generate a series of raw images indicating activity inside each of the source regions. In the case of SPECT or PET imaging, the raw data acquired in the projections is reconstructed in S403. By calibrating this SPECT/PET reconstructed image via a calibration factor, an internal dosimetric image 310A (radiopharmaceutical activity image) can be obtained. This internal dosimetric image 310A shows regions in the patient where radiopharmaceutical activity is present.

By superimposing the reconstructed SPECT/PET image on the anatomy of the patient obtained from a CT image (S404) the activity in regions or volumes of interest can be estimated. By applying an integration algorithm S405 on the estimated activity, the cumulated activity in the regions or volumes of interest (tumor uptake patterns) can be obtained from which the absorbed dose in each region or volume of interest can be calculated. This can be converted in S406 into a dose map 310B. The dose map quantitatively shows radiopharmaceutical distribution activity/dose uptake patterns by the tumor/diseased regions.

The internal dosimetric image/data 310 to be used in the EBRT adaptive process S100 of FIG. 3 could be any one of the internal dosimetric image/data 310A, 310B, 310C. The internal dosimetric image data 310 could also be dosimetric data obtained at a diagnostic, therapy, or post-therapy phase of the internal radiation treatment. The internal dosimetric image/data 310 is made available to the EBRT system 100 via the I/O 210, the DICOM or the imaging console.

The automated adaptive workflow S100 initiates the generation of a treatment plan for the EBRT system 100 via the treatment planning system 400. The treatment planning system 400 includes a patient model generating module 400A for generating a reference patient model 410, and a treatment plan generating module 400B for generating a reference treatment plan 420 for the reference patient model 410.

In a typical planning process, a reference image is taken of the patient, and a qualified medical personnel (physician) manually (or semi-automatically) delineates on the image the malignant tumor, as well as one or more organs, tissue, etc., that are susceptible to substantial damage from radiation exposure. Typical delineations for the malignant tumor include the gross target volume (GTV), the clinical target volume (CTV), and the planning target volume (PTV).

In the instant case, the reference image can be the CT image taken during the internal radiation protocol S300 to perform dosimetry in S302. The patient model generating module 400A is configured to automatically determine the targets to be irradiated and the targets to be avoided directly from the internal dosimetric image/data 310 obtained from the internal radiation protocol S300.

Figure 6:
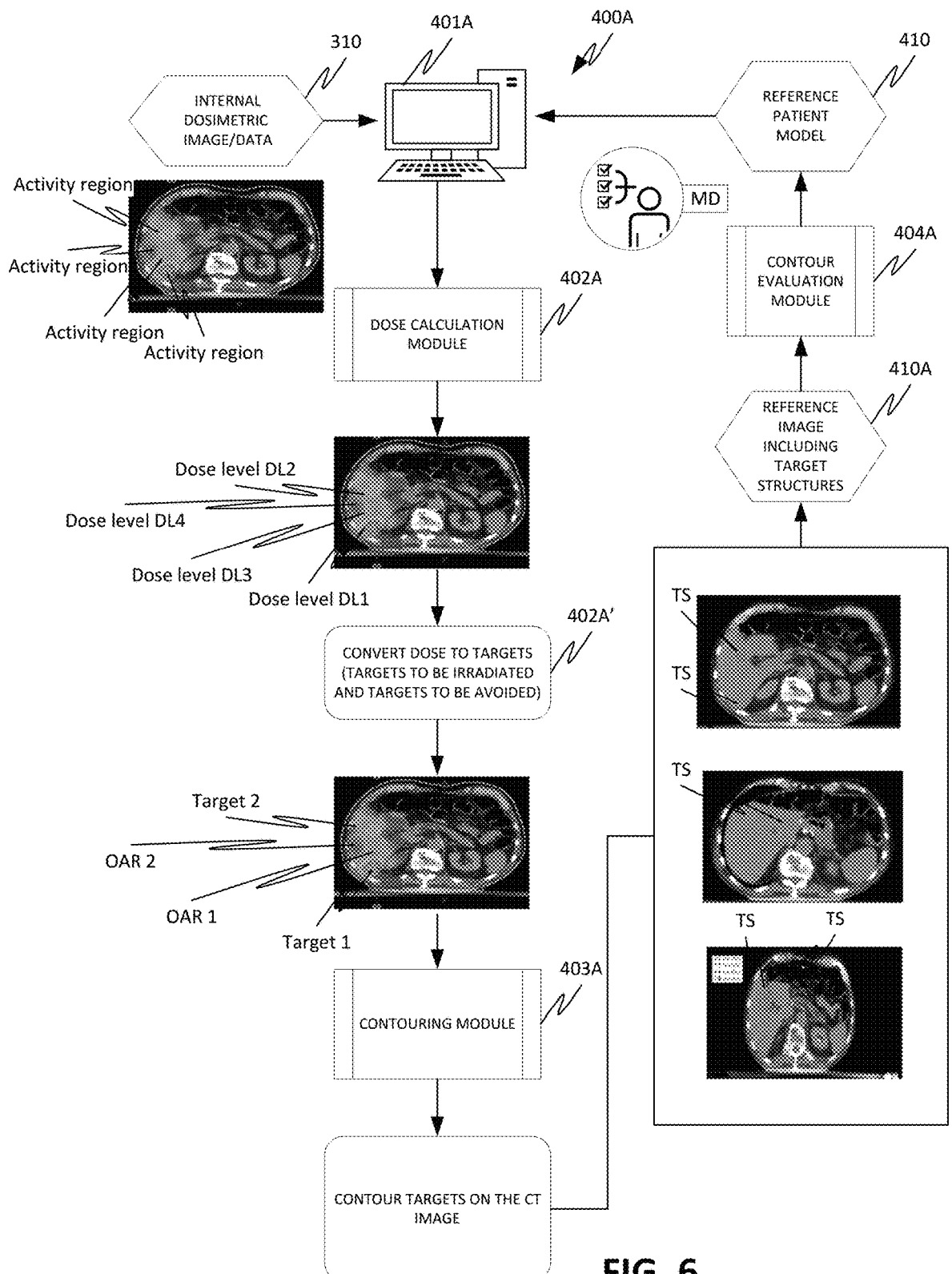
FIGS. 6-7 are illustrations of process flows for generating a reference patient model, according to various embodiments of the disclosed subject matter.

As shown in FIGS. 3 and 6, the patient model generating module 400A includes a dose calculation module 402A that applies a dose calculation algorithm to calculate radiation dose levels (DL1-DL4, for example) for each radiopharmaceutical distribution activity region shown in the internal radiation image 310. The dose calculation module 402A also applies a conversion algorithm 402A' to convert each of the calculated dose levels (DL1-DL4) into targets to be irradiated (Target 1-Target 3, for example) and targets to be avoided (OAR1-OAR2, for example).

The patient model generating module 400A also includes a contouring module 403A configured to automatically generate target structures (TS) that represent contours around the targets to be irradiated and the targets to be avoided on the CT image. The contours generated for the target structures to be irradiated include the gross target volume (GTV), the clinical target volume (CTV), and the planning target volume (PTV) for the tumor. Targets to be avoided can also automatically be cropped by asymmetric margins from irradiated targets for treatment planning.

The dose calculation and contouring modules implement software/hardware tools that allow for the direct conversion of regions showing radiopharmaceutical distribution activity into targets, and the delineation of the targets, including the gross target volume (GTV), the clinical target volume (CTV), and the planning target volume (PTV) for the tumor to be irradiated, and the delineation of the targets to be avoided (OARs, for example).

The dose calculation and contouring modules also implement software/hardware tools that allow for the use of the reconstructed SPECT/CT or PET/CT post-treatment image set from an internal radiation protocol to be used to create a radiation dose object representing the delivered dose, and to allow a user to define or select predefined contours via thresholding to be used in the dosimetry calculations for a local deposition model. The dose calculation and contouring modules can also assess radiopharmaceutical dose distribution, generate DVHs and isodose contours.

Figure 7:
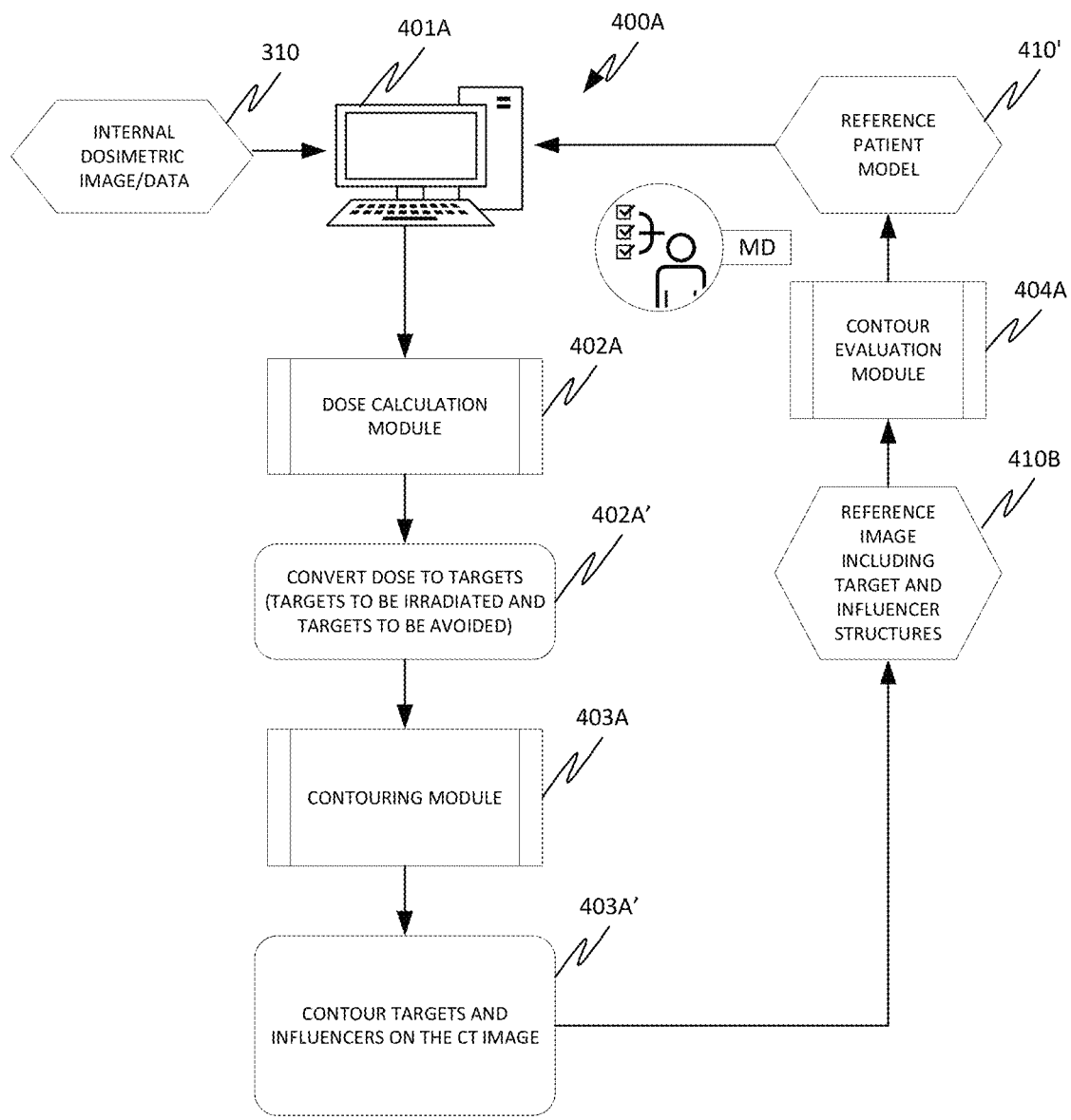
Figure 8:
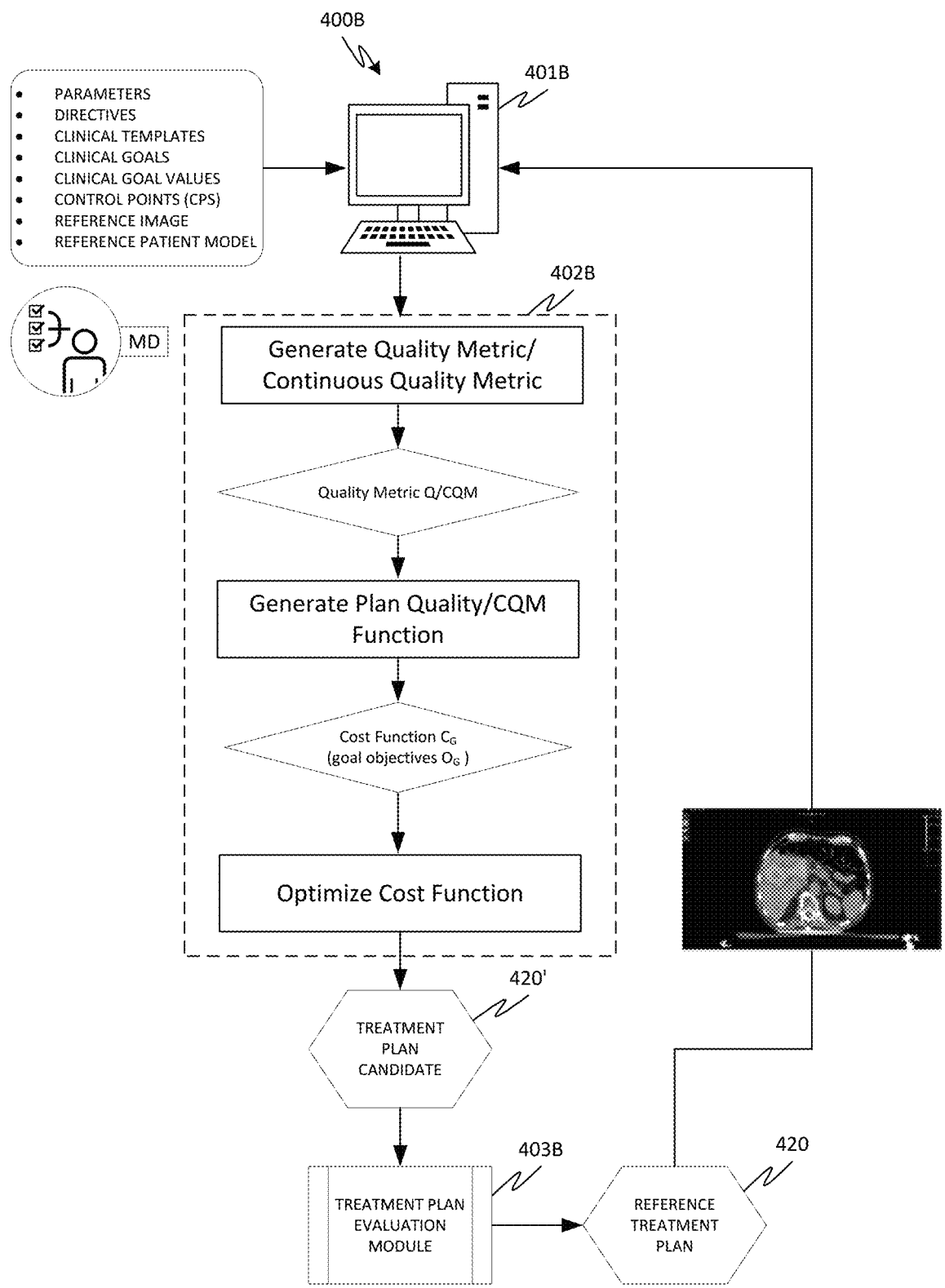
FIG. 8 is a process flow diagram for generating a reference treatment plan, according to various embodiments of the disclosed subject matter.

One or more anatomical structures of interest (body outlines, for example), as well as one or more influencer structures (contours of organs and/or non-volumetric structures that influence one or more of a shape, size, and location of one or more of the target structures TS) can also be generated on the reference CT image, as shown in FIG. 7.

Influencers are structures that influence one or more of the shape, size, and location of one or more of the primary target, the nodal target, the primary organ, and the other anatomical structures of interest during online adaptation. These influencers can include structures, such as organs, that generally move and/or exhibit large deformations and/or movements from day to day, as well as other non-volumetric structures, such as points or 2D lines, for example, which describe an anatomical situation.

The target structures (TS) delineated on the reference CT image 410A/410B can be evaluated on computer display 401A by a qualified medical personnel (physician) using a contour evaluation module 404A. If accepted, the reference image including the target structures/influencer structures/anatomical structures of interest becomes the reference patient model 410. The reference patient model 410/410', the reference image (i.e., CT image), the target structures on the reference image (i.e., reference target structures), as well as information regarding the reference image and the shapes and locations of the reference target structures in the reference image, and information regarding the influencers, and the other delineated anatomical structures are sent to the EBRT system 100 via the I/O 200, the DICOM, or the imaging console, or are made available to the EBRT system 100 via the I/O 200, the DICOM, or the imaging console.

To generate a treatment plan, the medical personnel (physician) generates a list of treatment parameters, such as but not limited to, the targets for which the radiation is to be maximized, target for which the radiation is to be minimized, and other parameters and directives related to the specific EBRT system 100 and imaging device 101 that will deliver the treatment plan to the patient 110. The physician also specifies a preferred dose distribution for the target structures. The dose distribution is expressed as a set or a template of clinical goals (CG), which are suitable goals of radiation doses for the treatment of the patient. These clinical goals (CG) can be given for example in the form of mean dose of radiation (in Gray) to a target structure and the dose that certain volume of an organ, such as an organ at risk (OAR), must not exceed. Clinical goals, however, may also be given in other dimensions that are not in the form of dose of radiation to a target structure and dose to volume of organ. Each of the given goals can further be ordered in priority describing the importance of meeting a goal in comparison to another goal. Such a set is referred to as a prioritized set of clinical goals (prioritized CG). Each clinical goal can be expressed as a quality metric Q and its associated goal value. An exemplary prioritized set of clinical goals is:

GOAL 1: Target (PTV) must receive 50 Gy: Priority 1
GOAL 2: Organ at risk X (OARx) must receive less than 25 Gy: Priority 2
GOAL 3: Organ at risk Y (OARy) must receive a mean dose of less than 30 Gy: Priority 3

Other exemplary reference clinical goal templates are shown in FIGS. 9 and 10.

The treatment plan generating module 400B then automatically generates an optimized plan for the reference patient module 410 (i.e., the reference plan 420) by minimizing, via an optimization process, a cost function (CG) defining the dose distribution for the set of prioritized clinical goals (CG). There are many algorithms that can be applied to minimize a cost function, including but not limited to, calculating the gradient of the cost function. The solution to the optimization process results in treatment parameters being determined for the treatment plan candidate 420'. To optimize the treatment plan, at the outset of the treatment planning process, a number of control points (CPs) are also specified for the beam trajectory that takes into consideration the beam shaping elements of the EBRT system 100. Each control point (CP) is associated with a set of treatment parameters, including but not limited to, a set of (MLC) leaf positions, (MLC) shape, gantry rotation speed, gantry position, dose rate, and/or any other parameters. The number and positions of the control points (CPs) may be set in any convenient manner, such as, but not limited to, by using the treatment planning software, or by the system operator. In an exemplary embodiment, the beam trajectory can include a single 180 degrees arc trajectory and approximately 177 sequential control points (CPs), which means that there are 177 configurations that the LINAC should conform to in order to deliver the planned treatment. Based on the treatment parameters, a dose distribution within the treatment volume can be calculated for each control point (CP) by any number of techniques, such as, but not limited to, pencil beam convolution, or any other suitable algorithm, and the radiation dose distribution for each (CP) can be associated with the corresponding gantry angle, (MLC) configuration, and monitor unit (MU). As such, during treatment delivery, the extracted (CP) parameters can be associated with corresponding calculated dose distributions for each (CP).

The physician can also evaluate the treatment plan candidate 420' at 403B. The accepted treatment plan candidate becomes the reference treatment plan 420. The reference treatment plan 420 and associated parameters (i.e., reference clinical goals, reference dose specification, reference clinical goal values, reference treatment plan 3D dose, how the plan was optimized, reference control points, etc.) are stored in a storage device of the treatment planning system 400, to be later retrieved by the EBRT system 100 for operating the EBRT system 100 to deliver radiation treatment according to a chosen radiation treatment plan.

The physician also develops a set of adaptive directives 230, which is a list of parameters/directives/information that describes the intent of the adaptive treatment, namely, the 4D description of the planned treatment for the patient 110. The set of adaptive directives can include information regarding the planned (reference) dose specification (i.e., Rx prescription), whether adaptive or standard IGRT therapy is to be used, the prescribed clinical goals, such as but not limited to, the target dose coverage and (OAR) risk dose limits, planned (reference) clinical goal values, the planning (reference) image, supporting images with their corresponding registration information (PET, MRI, etc.), the planned (reference) patient model (i.e., the contours of the reference structures, such as the target volumes, OARs and other internal dose derived structures on the reference image), the planned (reference) treatment plan (RT Plan), the planned (reference) treatment plan 3D dose (i.e., RT 3D dose), a list of the reference structures (target volumes, OARs, influencer structures, body outlines), a list of influencer structures of different treatment sites, information regarding the shapes and location of the planned (reference) structures on the planned (reference) image, as well as any information as to how the planned (reference) treatment plan was optimized.

The intent of the adaptive radiotherapy is to appropriately modify the radiation treatment plan (i.e., the reference treatment plan 420) to account for the temporal changes in the anatomy. As such, images, such as CBCT images for example, obtained during a treatment session (i.e., a treatment session image 500) at the treatment site are sent to the treatment planning system 400 where the treatment plan can be adapted to the current anatomy via deformable registration software and sent back to the EBRT system 100 for delivery.

In order to adapt the reference treatment plan 420, first an accurate session patient model 600 (i.e., contours on the current anatomy) is generated, then the reference treatment plan 420 properly modified to fit the new anatomy, then quickly evaluated for application on the patient 110. The on-couch adaptive workflow 220 generates the session patient model 600 in a step-wise fashion through a series of automated steps guided by the set of adaptive directives 230. The set of directives 230 are also used to guide the generation (700) and the selection (800) of a treatment plan that is most appropriate for the current anatomy of the patient.

A radiation technologist (RTT/MTA) who is skilled and trained at reviewing anatomy and plan selection, and who is tasked to deliver the adaptive treatment on the patient (i.e., the user/adapter), executes the first level of treatment modification, which is setting the patient on the treatment couch and moving the patient to the imaging position (see FIG. 2).

After the patient setup, one or more treatment session images (500) of the portion of the patient 110 that is of interest are taken using the radiation imaging device 101. In an exemplary embodiment, the treatment session image is a 3D or 4D CBCT scan for example obtained during a treatment session by irradiating the region of interest of the patient 110 with radiation 120. This treatment session image may show boney structures of the patient but does not include any delineations of target volumes or other structures.

Figure 11:
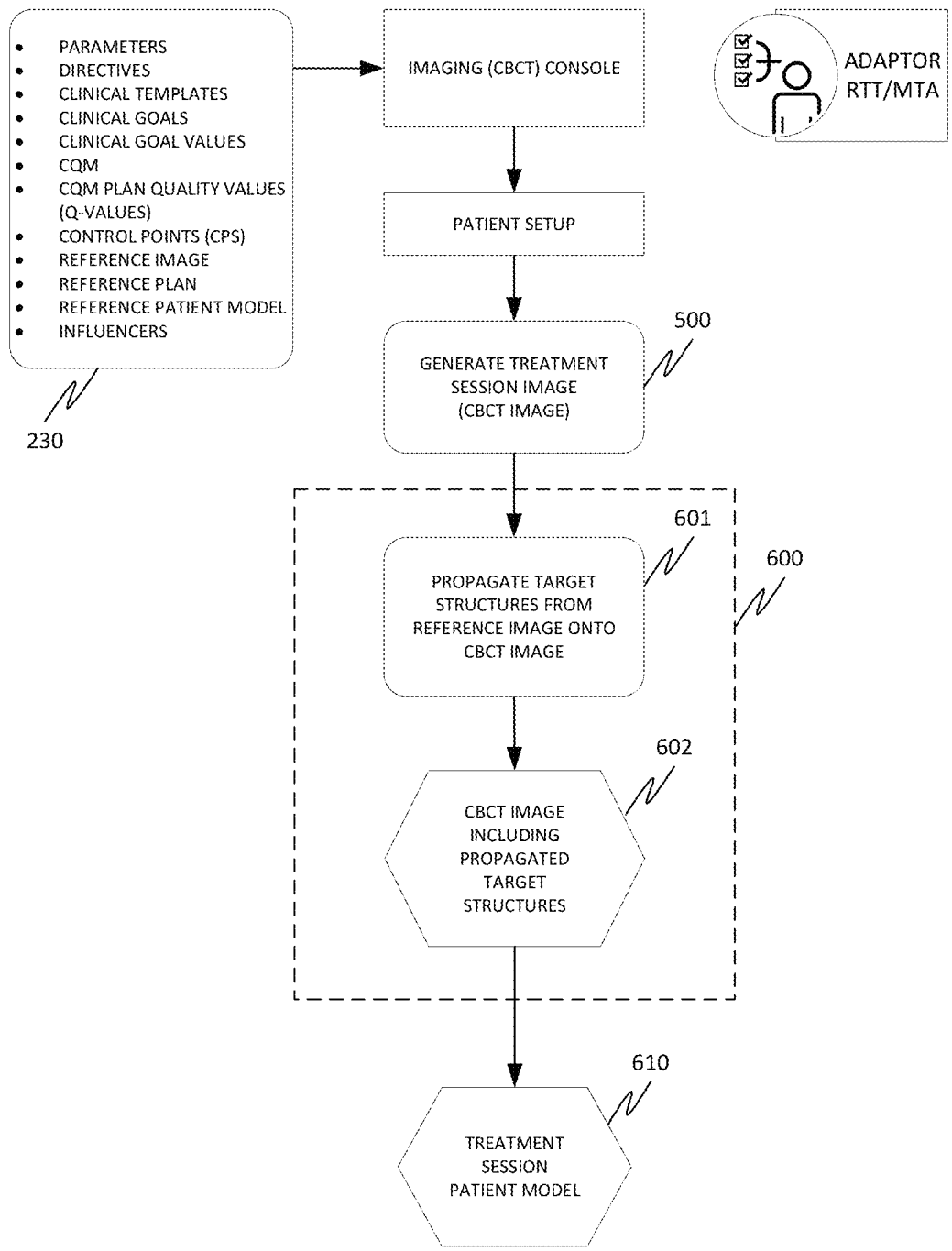
FIGS. 11-14 are process flow diagrams for a session patient model generation, according to various embodiments of the disclosed subject matter.
Figure 12:
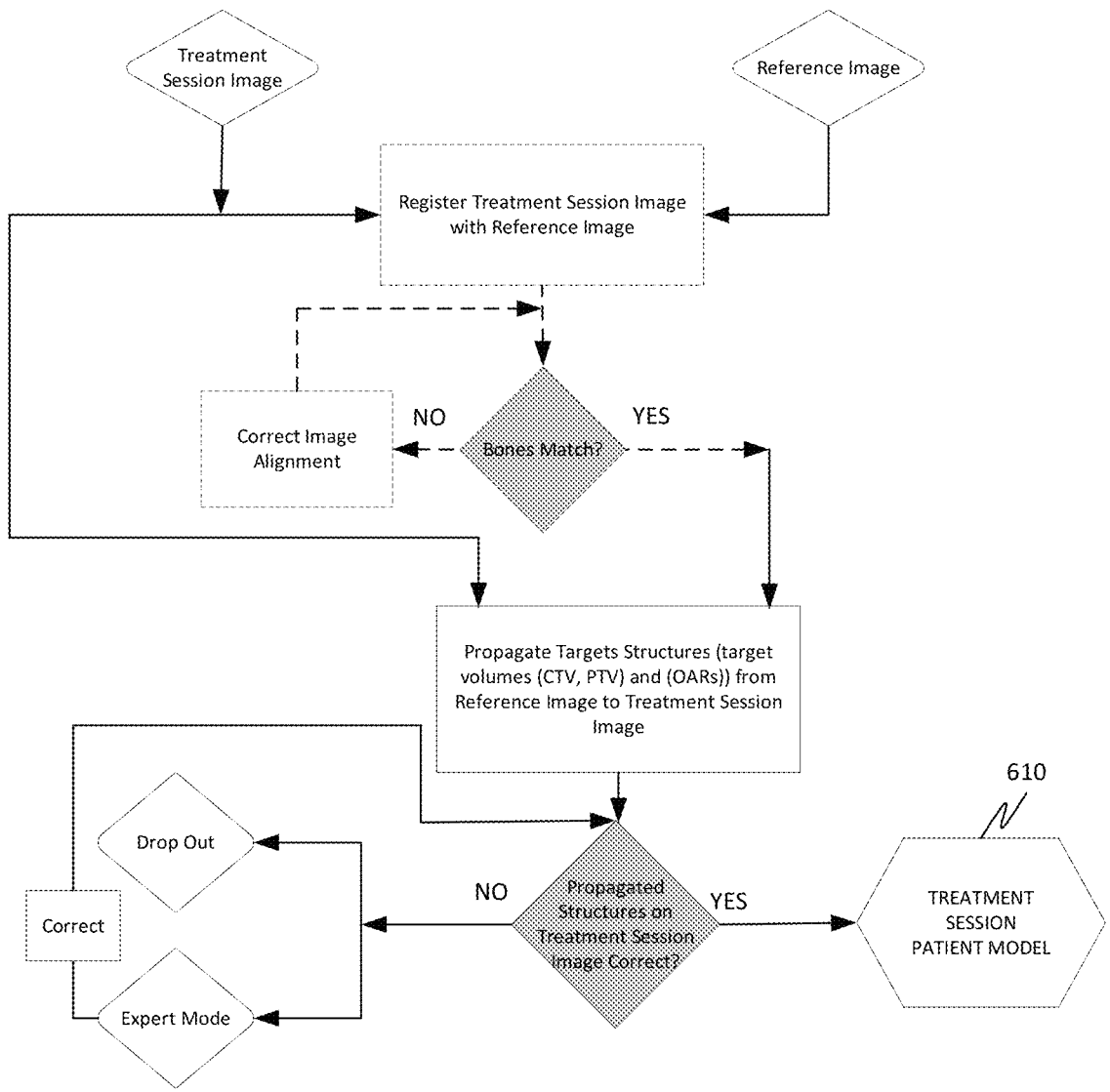

Then, the RTT/MTA initializes, via the contouring module 403A, the generation of contours of the reference structures on the treatment session image 500 to obtain a treatment session patient model 600. This can be done by propagating (601) the reference target structures (TS) from the reference image 410A onto the treatment session image 500 to obtain a treatment session image containing the propagated target structures (602). The RTT/MTA can evaluate the so obtained treatment session image, and if accepted, this image becomes the treatment session patient model 610, as shown in FIGS. 11 and 12.

Figure 13:
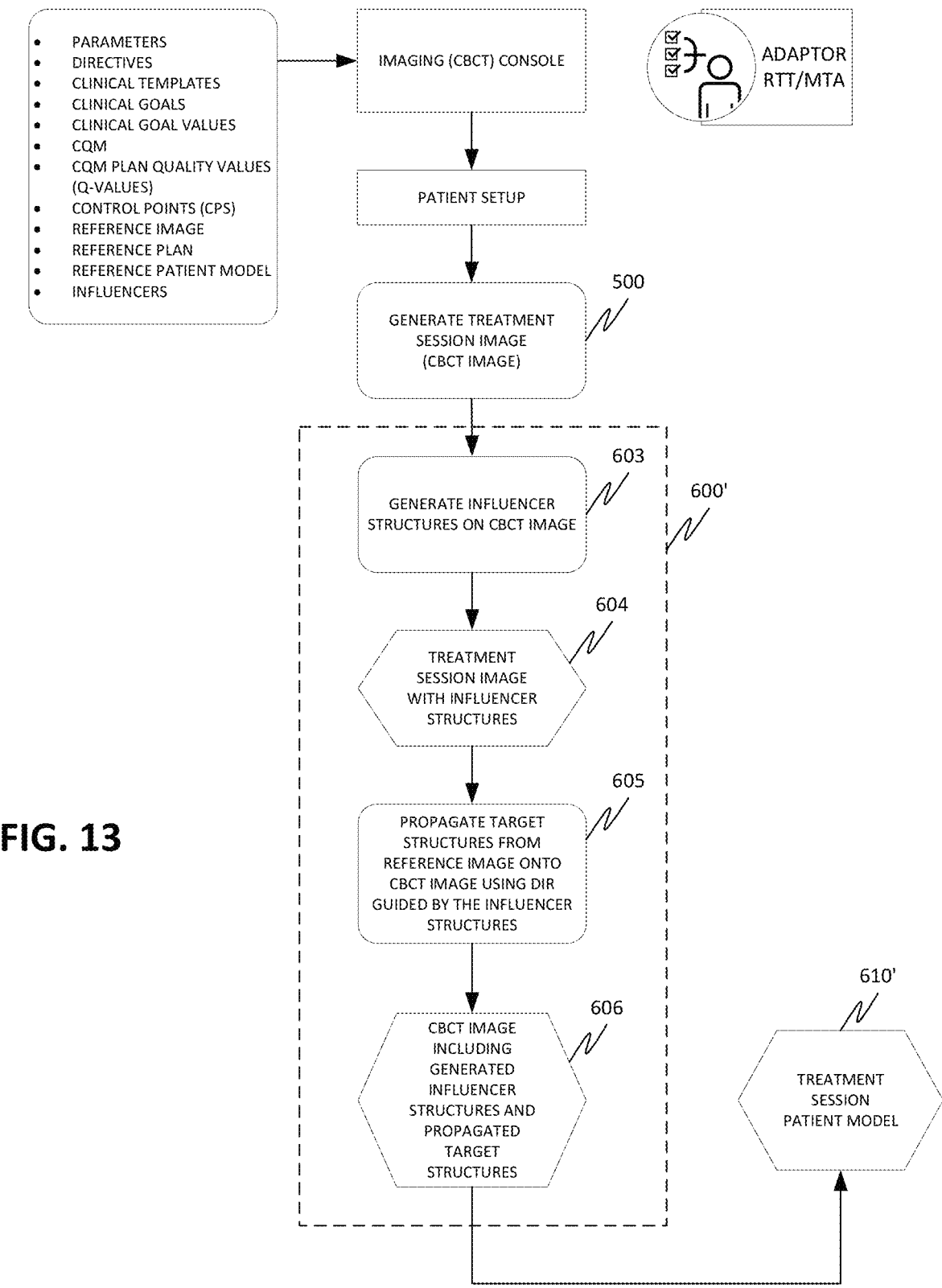
Figure 14:
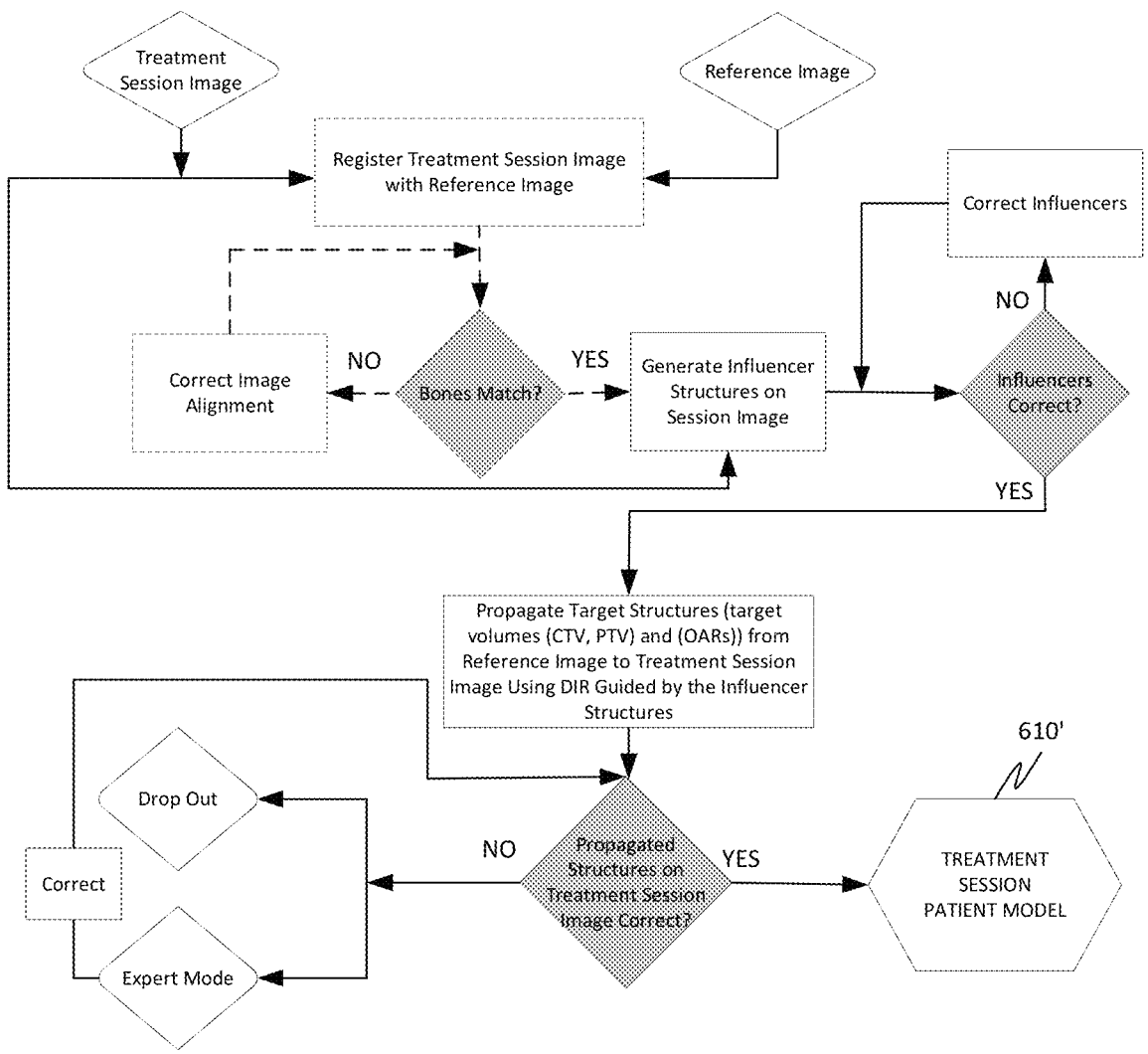

Alternatively, the RTT/MTA initializes (603) the delineating of influencers that are included in the set of adaptive directives 230 on the treatment session image 500, then the RTT/MTA initiates (605) the propagation of the reference target structures (TS) included in the reference image 410A'. Namely, the RTT/MTA initiates propagation of the target volumes (CTV, PTV, etc.), OARs, and other anatomical structures of interest besides the influencer structures that were present in the reference image 410A'. The RTT/MTA can evaluate the obtained treatment session image (606) and if accepted, this image becomes the treatment session patient model 610', as shown in FIGS. 13 and 14.

The propagation can be done using a structure-guided deformable registration algorithm (Structure-Guided DIR) that registers the image data of the reference image 410A/ 410A' with the image data 510 of the treatment session image 500, and which generates, as a result, one or more deformable vector fields (DVFs) used to propagate the target volumes (CTV, PTV, etc.), OARs, and other anatomical structures of interest from the reference image 410A/410A' to the treatment session image 500 using the contour propagation module 403A.

When influencers are used, the guided deformable registration is a deformable registration that is guided by the relationship between the influencer structures that are present in the reference image 410A' and those that were generated in the treatment session image 500.

To generate the different treatment plans 700, first the correct treatment isocenter is determined. As shown in FIG. 16, when starting the adaptive workflow 220, the patient 110 is setup on the treatment couch 112 the same way as for a standard radiation therapy treatment. Therefore, after positioning the patient 110 on the treatment couch 112, the patient 110 is taken to the EBRT system 100 isocenter, using traditional skin marks indicating the location of the isocenter.

When the treatment session image (i.e., the CBCT image, for example) 500 is acquired, the center of the treatment session image 500 corresponds to the acquisition isocenter. If the patient 110 is treated by aligning the acquisition isocenter with the system isocenter, the patient 110 will not be treated correctly, since, as shown in FIG. 16, the session target volume does not align with the reference target volume.

In order to determine the correct treatment isocenter, once the RTT/MTA accepts the propagated target structures on the treatment session image 500, the EBRT system 100 is prompted at S711 to automatically align the reference target structure/volume of the reference patient model 410/410' to the treatment session target structure/volume of the treatment session patient model 610/610'.

As shown in FIG. 16, this alignment provides the difference between the acquisition isocenter and the reference treatment isocenter. From this difference, the translation (X, Y, Z) values, namely, by how much in the X, Y, and Z direction does the patient 110 need to be moved for the two isocenters to align, is calculated. The calculated translation values are then applied to the acquisition isocenter so that the treatment isocenter location is determined at S712. This treatment isocenter location is then provided to the plan generation algorithm 402B which, using the information regarding the reference treatment plan 420, generates a scheduled plan 714. The scheduled plan 714 also contains information regarding the new treatment couch 112 location, which will be communicated to the EBRT system 100 if the scheduled plan is selected for treatment. When the scheduled treatment plan contains a new treatment couch position, it forces the RTT/MTA to apply (move the treatment couch 112) to the new location.

In order to generate an adaptive plan, generally, the propagated treatment session structures (i.e., target structures, OARs) as well as a synthetic (simulated) image of the patient are used as inputs to a plan generation algorithm to optimize a reference plan. The synthetic image is needed in order to generate a treatment plan from a stable and reproducible patient position. Generating a synthetic image involves a series of steps, including having to register the treatment session image with the reference image including the reference structures, using the result of the registration as an input to a deformable registration algorithm, and using the output from the deformable registration algorithm together with the data regarding the body outlines from the treatment session image as input to a synthetic image generation algorithm.

The automated adapted plan generating process described herein does not need synthetic image data as an input, and as such, bypasses the need for the additional steps involved in having to generate a synthetic image. Instead, the adapted plan generation algorithm uses the propagated treatment session structures (i.e., target structure, OARs) as input to modify the scheduled plan 714 based on the new anatomy. This is possible because the reference plan and associated data is derived directly from the CT image of the internal radiation.

Figure 15:
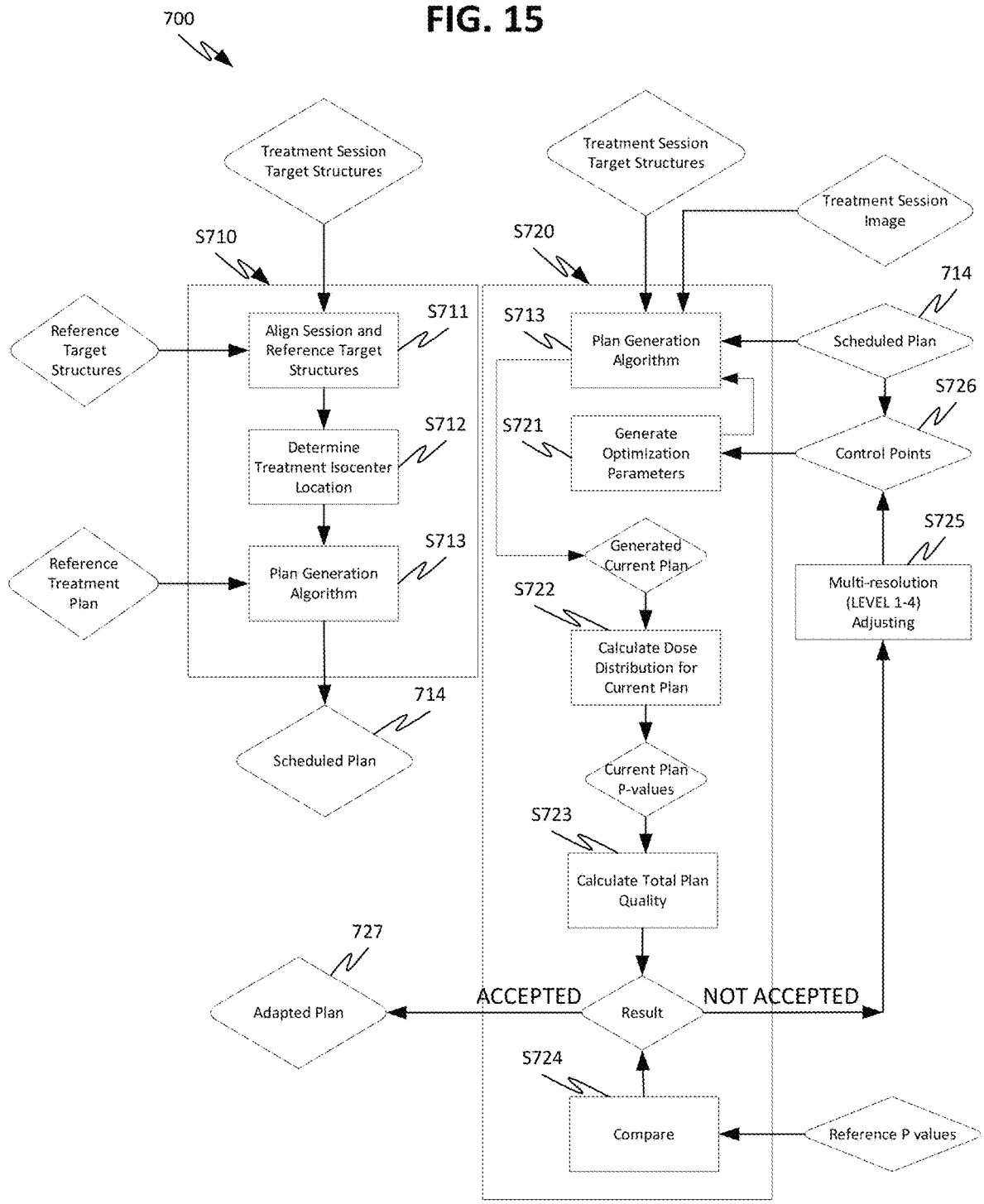
FIG. 15 is a process flow diagram for generating different treatment plans for a session patient model, according to various embodiments of the disclosed subject matter.

As shown in FIG. 15, the automated plan generation algorithm of S720 takes the propagated treatment session structures (i.e., target structure, OARs) as input to modify the scheduled plan 714 based on the new anatomy. The treatment parameters of the scheduled plan 714 for one or more control points (CP) can be used to automatically generate in S721 a set of optimization parameters/criteria for the adaptive plan generation in S713.

For example, based on the (MLC) configuration for each control point (CP) in the scheduled plan 714, the dose distribution for the current plan can be calculated. The calculated dose distribution indicates the actual dose distribution in the target structures and the OARs that can be achieved based on the current plan. Since a mapping of the priority value P (i.e., priority 1, priority 2, priority 3, etc.) with respect to an original clinical goal (CG) to an achieved value of that goal (i.e., the actual dose achieved for that goal) gives the plan quality for that goal, a plan quality for the current plan with respect to an original clinical goal (CG) can be determined from the calculated dose distribution. This can be done by determining the priority value P corresponding to the actual dose value for that goal. In the case that the quality goal metrics are represented by quality functions (Q-functions), the P values can be read from the Q-functions generated for the clinical goals. The greater the value of the priority P for a goal, the better that goal has been met, and thus the better the quality of the plan for that goal.

From the calculated dose distribution of S722, therefore, a set of plan quality values Ps for the current plan can be obtained, one for each of the original clinical goals CG.

Optionally, an overall plan quality for the current plan can also be obtained in S723 from the individual current plan qualities by taking the minimum of all the individual goal quality values, for example.

Alternatively, the overall plan quality for the current plan can be obtained by defining an overall plan quality as one that minimizes the difference to the individual plan qualities.

Based on the value P of the overall quality of the current plan in S723, a decision can be made as to whether the current plan is acceptable in S724, in which case the current plan becomes the adapted plan 727. In case the current plan is not acceptable, the control points used as input to the optimization algorithm in S721 are automatically adjusted via multi-resolution adjusting in S725. Adjusting the control points changes the dose distribution in S722, which then changes the plan quality values of the current plan. The total plan quality is then again calculated in S723 to determine whether the subsequently obtained plan is acceptable or whether further adjusting of the control points in S725 is needed.

The multi-resolution adjusting in S726 allows multi-level (four levels for example) adjusting, from a coarse adjustment at level 1, to a fine adjustment at level 4. The level 4 adjustment allows for the fine tuning of the dose distribution.

For each iteration of the optimization algorithm, the decision as to whether the individual plan quality values or the overall plan quality value for the current plan are acceptable can be made by comparing in S724 the calculated quality values/value with the plan quality values/total plan quality value of the original treatment plan, for example. If the differences exceed a predetermined threshold, the result is determined to not be acceptable, in which case the control points (CPs) are gradually modified in S725. The amount of adjustment, and thus the resolution level, can be determined based on the calculated differences.

When accepted, the adapted plan 727 is optimized to a dose distribution of similar dosimetric characteristics as the dose distribution of the originally planned treatment plan (i.e., reference treatment plan 420). Thus, the adapted plan 727 should meet the original clinical goals to a similar degree as the original/reference treatment plan 420.

Figure 17:
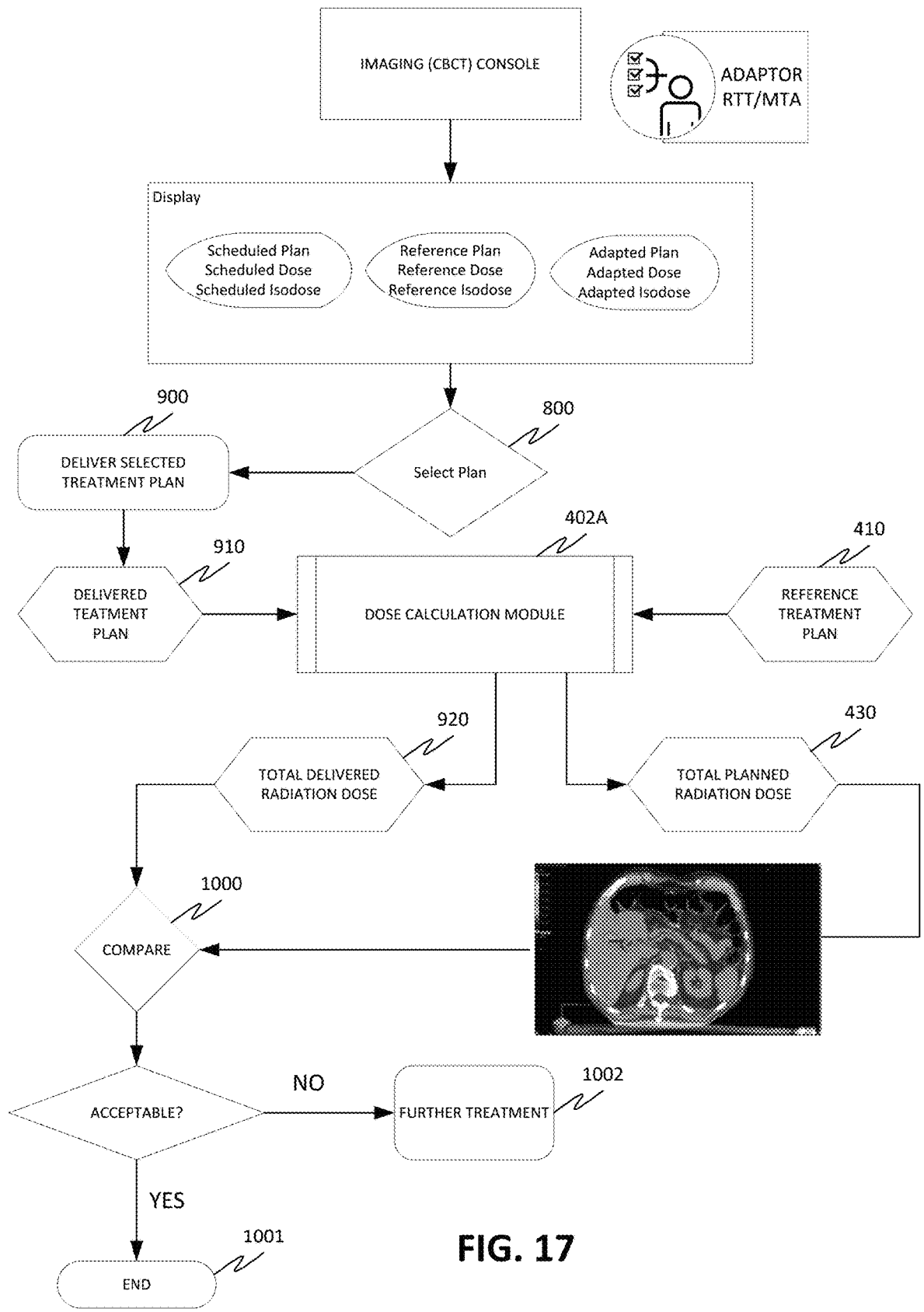
FIG. 17 is a process flow diagram for selecting and delivering a treatment plan, and determining further treatment, according to various embodiments of the disclosed subject matter.
Figure 19:
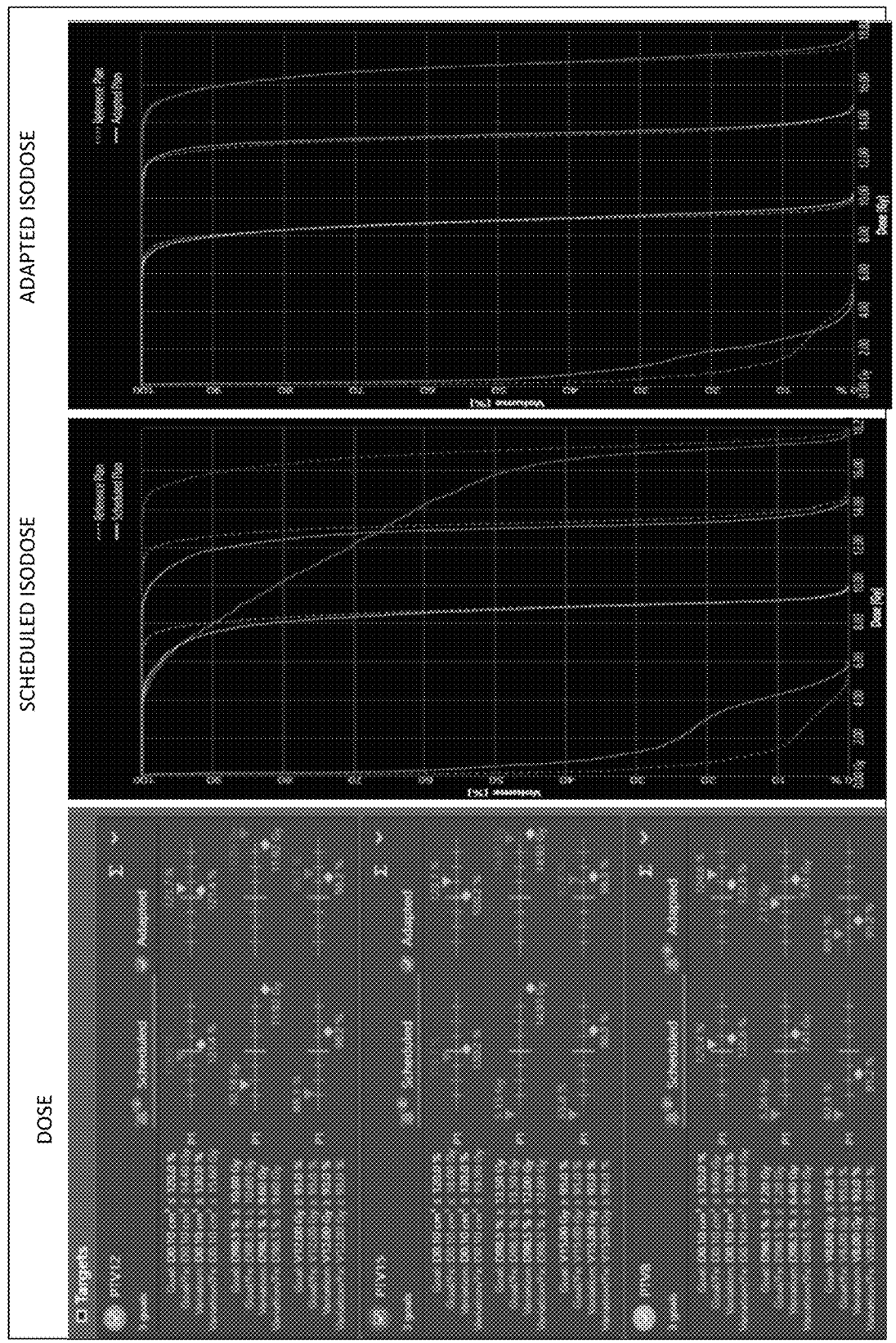

The reference treatment plan 420, the scheduled treatment plan 714, and the adapted treatment plan 727 can be applied to the dose calculation algorithm of the dose calculation module 402A to calculate the respective radiation doses to be applied to the treatment session target structures/volumes according to the respective treatment plans. The reference, scheduled, and adapted dose matrices so generated can be sent together with the generated reference, scheduled and adapted plans and reference, scheduled, and adapted isodose values to the display device to be displayed for the RTT/MTA user, as shown in FIGS. 17-19, for the user to select 800 the appropriate plan to be delivered to the patient.

The RTT/MTA is also provided with one or more tools (hardware, software, etc.) to evaluate the scheduled plan and the adapted plan. The tools may include tools that provide Isodose distribution of the reference plan on the reference image, Isodose distribution of the scheduled plan on the treatment session image, Isodose distribution of the adapted plan on the session treatment image, Dose Volume Histograms (DVHs) of the reference plan, the scheduled plan and the adapted plan. The tools may also include tools for clinical goals evaluation to provide the reference clinical goal values, and the scheduled and adapted plan clinical actual values. Optionally, the RTT/MTA may be presented with other images, such as those from the internal radiation treatment, that may help in the plan selection process. The RTT/MTA can select what information to be displayed and what additional tools to use to help in the selection of the most appropriate plan.

The RTT/MTA uses the reference clinical goals and reference clinical goal values in the set of directives to quantitatively assess if the scheduled and/or the adapted plan is medically necessary for the treatment session of the day (i.e., the current treatment session). For this, the reference clinical goal values and the actual clinical values for the scheduled and adapted treatment plans are presented to the RTT/MTA on the display, and the RTT/MTA selects the treatment plan that provides the clinical values closest to the reference clinical goal values.

Once the user selects a treatment plan, the radiation treatment will proceed according to the selected plan 900. The prescribing physician which generated the original/reference treatment plan 420, the adaptive directives 230, and the adaptive workflow 230, or any other qualified physician, can review and/or monitor the treatment delivery offline, as shown in FIG. 2.

The calculated dose 920 for the delivered radiation plan 910 (i.e., the scheduled treatment plan or the adapted treatment plan, or another other contingency treatment plan that is created based on the reference plan but for previously calculated average target volume positions (average CTV position) that include greater dose margins than those calculated for the reference target volumes) can be compared at 1000 to the reference/planned radiation dose, and if it is not acceptable, further treatment protocols 1002 are contemplated, as shown in FIG. 17. The further treatment protocol 1002 may be one of another internal radiation protocol, another EBRT protocol, or another treatment protocol that a qualified personnel determines to be suitable. Otherwise, the dual modality radiation protocol ends at 1001.

Throughout the adaptive radiation treatment, plan checks can be validated to ensure delivery on the treatment device using DICOM artifacts (reference plan, images, structures, doses, etc.), which are provided for independent quality assurance. Optionally the independent validation application communicates back to the adaptive workflow application with the results of the validation (QA).

It is thus apparent that the disclosed subject matter enables for the use of internal dosimetric data to generate a reference patient model, and a set of directives to guide an adaptive workflow to generate a treatment session patient model and to generate and select an appropriate treatment plan for the treatment session.

It is thus also apparent that the disclosed subject matter enables for a system and method for sequentially exposing a patient, to a dual modality radiation protocol, the dual modality radiation protocol including an internal radiation protocol and an external beam radiation protocol, as disclosed herein.

It will be appreciated that the aspects of the disclosed subject matter can be implemented, fully or partially, in hardware, hardware programmed by software, software instruction stored on a computer readable medium (e.g., a non-transitory computer readable medium), or any combination of the above.

For example, components of the disclosed subject matter, including components such as a controller, process, or any other feature, can include, but are not limited to, a personal computer or workstation or other such computing system that includes a processor, microprocessor, microcontroller device, or is comprised of control logic including integrated circuits such as, for example, an application specific integrated circuit (ASIC).

Features discussed herein can be performed on a single or distributed processor (single and/or multi-core), by components distributed across multiple computers or systems, or by components co-located in a single processor or system. For example, aspects of the disclosed subject matter can be implemented via a programmed general purpose computer, an integrated circuit device, (e.g., ASIC), a digital signal processor (DSP), an electronic device programmed with microcode (e.g., a microprocessor or microcontroller), a hard-wired electronic or logic circuit, a programmable logic circuit (e.g., programmable logic device (PLD), programmable logic array (PLA), field-programmable gate array (FPGA), programmable array logic (PAL)), software stored on a computer-readable medium or signal, an optical computing device, a networked system of electronic and/or optical devices, a special purpose computing device, a semiconductor chip, a software module or object stored on a computer-readable medium or signal.

When implemented in software, functions may be stored on or transmitted over as one or more instructions or code on a computer-readable medium. The steps of a method or algorithm disclosed herein may be embodied in a processor-executable software module, which may reside on a computer-readable medium. Instructions can be compiled from source code instructions provided in accordance with a programming language. The sequence of programmed instructions and data associated therewith can be stored in a computer-readable medium (e.g., a non-transitory computer readable medium), such as a computer memory or storage device, which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

As used herein, computer-readable media includes both computer storage media and communication media, including any medium that facilitates transfer of a computer program from one place to another. Thus, a storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a transmission medium (e.g., coaxial cable, fiber optic cable, twisted pair, digital subscriber line (DSL), or wireless technologies such as infrared, radio, and microwave), then the transmission medium is included in the definition of computer-readable medium. Moreover, the operations of a method or algorithm may reside as one of (or any combination of) or a set of codes and/or instructions on a machine readable medium and/or computer-readable medium, which may be incorporated into a computer program product.

One of ordinary skill in the art will readily appreciate that the above description is not exhaustive, and that aspects of the disclosed subject matter may be implemented other than as specifically disclosed above. Indeed, embodiments of the disclosed subject matter can be implemented in hardware and/or software using any known or later developed systems, structures, devices, and/or software by those of ordinary skill in the applicable art from the functional description provided herein.

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

The terms "system," "device," and "module" have been used interchangeably herein, and the use of one term in the description of an embodiment does not preclude the application of the other terms to that embodiment or any other embodiment.

Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. A radiation treatment method, comprising:
exposing a patient to a dual modality radiation protocol, the dual modality radiation protocol including:
an internal radiation protocol; and
an external beam radiation protocol,
the internal radiation protocol including:
administering a radiopharmaceutical to the patient; and
generating a dosimetric image of a distribution of a radiopharmaceutical activity within the patient; and
the external beam radiation protocol including implementing an automated workflow to:
generate a radiation treatment plan based on dosimetric image data;
adapt the radiation treatment plan for a current treatment session using a set of directives; and
deliver the adapted treatment plan to the patient.

2. The radiation treatment method of claim 1, wherein the internal radiation protocol is a protocol included in one of a radioactive systemic therapy, a radio-embolic radiation treatment, a chemotherapy, an immunotherapy, or a targeted radiation therapy.

3. The radiation treatment method of claim 1, wherein the external beam radiation protocol is an on-couch adaptive radiotherapy protocol, and the automated workflow is an automated adaptive workflow.

4. The radiation treatment method of claim 1, wherein the dosimetric image of the distribution of the radiopharmaceutical activity within the patient is a diagnostic dosimetric image, a treatment dosimetric image, or a post-treatment dosimetric image.

5. The radiation treatment method of claim 4, wherein the dosimetric image is a SPECT/CT or PET/CT reconstructed image.

6. The radiation treatment method of claim 1, wherein the dosimetric image of the distribution of the radiopharmaceutical activity within the patient is an absorbed dose map.

7. The radiation treatment method of claim 1, wherein the generating of the radiation treatment plan based on the dosimetric image data comprises:
using the dosimetric image of the distribution of the radiopharmaceutical activity within the patient to generate a reference patient model; and
selecting a set of planned clinical goals for the reference patient model as an input to a plan generation and optimization algorithm,
wherein the plan generation and optimization algorithm derives objectives for the set of planned clinical goals and generates a reference treatment plan that fulfills the derived objectives.

8. The radiation treatment method of claim 7, wherein the generating of the reference patient model comprises:
calculating an absorbed radiation dose from the dosimetric image data;
converting the absorbed radiation dose to targets to be irradiated and targets to be avoided; and
applying an automated contouring process to generate target structures on a reference image, the target structures representing contours of the targets to be irradiated and contours of the targets to be avoided,
the reference image being an image used in obtaining the dosimetric image of the distribution of the radiopharmaceutical activity within the patient.

9. The radiation treatment method of claim 8, wherein the automated contouring process further generates influencer structures representing contours of one or more organs that affect one or more of a shape, a size, or a location of one or more of the target structures.

10. The radiation treatment method of claim 8, wherein the target structures include one or more contours of a primary tumor and contours of one or more organs at risk (OARs).

11. The radiation treatment method of claim 10, wherein the set of planned clinical goals are expressed as a radiation dose to the target structures and a radiation dose that the OARs must not exceed.

12. The radiation treatment method of claim 10, wherein the set of planned clinical goals are expressed as quality metrics and associated goal values.

13. The radiation treatment method of claim 8, wherein the adapting of the radiation treatment plan for the current treatment session comprises:
using the set of directives to perform a series of automated steps to:
generate a treatment session patient model;
generate a first treatment plan and a second treatment plan for the treatment session patient model; and
select a treatment plan that is appropriate for the current treatment session.

14. The radiation treatment method of claim 13, wherein the set of directives includes information regarding a planned radiation dose, planned clinical goals, planned clinical goal values, reference patient model, a reference treatment plan, reference plan quality values, a list of influencer structures, and control points.

15. The radiation treatment method of claim 14, wherein the generating of the treatment session patient model comprises:
generating a treatment session image of a portion of the patient containing an anatomy of interest; and
propagating the target structures on the reference image to the treatment session image.

16. The radiation treatment method of claim 15, wherein the propagating of the target structures is guided by one or more influencer structures from the list of influencer structures.

17. The radiation treatment method of claim 15, wherein the treatment session image is a CBCT image.

18. The radiation treatment method of claim 14, wherein the generating of the first treatment plan comprises:
obtaining a reference isocenter location for the reference patient model from the set of directives;
determining an acquisition isocenter location for the treatment session patient model;
aligning target structures in the treatment session patient model with corresponding reference target structures in the reference patient model;
determining a difference between the reference isocenter location and the acquisition isocenter location;
determining a treatment session isocenter location by applying the determined difference to the acquisition isocenter location; and
using the treatment session isocenter location as an input to the plan generation and optimization algorithm to generate the first treatment plan.

19. The radiation treatment method of claim 18, wherein the generating of the second treatment plan comprises:
using the first treatment plan as an input to the plan generation and optimization algorithm to generate a current plan, wherein the plan generation and optimization algorithm includes optimization parameters which are automatically generated based on control points of the first treatment plan; and generating the second treatment plan by optimizing the current plan based on plan quality values of the first treatment plan.

20. The radiation treatment method of claim 19, wherein the first treatment plan is a scheduled treatment plan, and the second treatment plan is an adapted treatment plan.

21. The radiation treatment method of claim 20, further comprising:
comparing the first treatment plan and the second treatment plan to the reference treatment plan;
selecting a treatment plan that is suitable for the current treatment session based on the comparing; and
delivering the selected treatment plan.

22. The radiation treatment method of claim 20, further comprising:
calculating a planned dose accumulation and a delivered dose accumulation; and
determining a further treatment protocol based on a result of a comparison.

23. The radiation treatment method of claim 22, wherein the further treatment protocol is a further internal radiation protocol or a further external beam radiation protocol.

24. A method for generating a treatment plan for an external beam radiation therapy, comprising:
obtaining a dosimetric SPECT/CT or PET/CT image from an internal radiation treatment system indicating a radiopharmaceutical uptake within a patient;
automatically converting the radiopharmaceutical uptake into targets to be irradiated and targets to be avoided;
applying an automated contouring process to generate target structures on a reference image, the target structures representing contours of the targets to be irradiated and contours of the targets to be avoided, the reference image being a CT image used to obtain the dosimetric SPECT/CT or PET/CT image; and
selecting a set of planned clinical goals for the target structures as an input to a plan generation and optimization algorithm to automatically derive objectives for the set of planned clinical goals and generate a reference treatment plan that fulfills the derived objectives.

25. The method of claim 24, wherein the target structures include one or more contours of a primary tumor and contours of one or more organs at risk (OARs).

26. The method of claim 25, wherein the set of planned clinical goals are expressed as quality metrics and associated goal values.

27. The method of claim 26, further comprising adapting the reference treatment plan for a current treatment session.

28. The method of claim 27, wherein the adapting the reference treatment plan includes using a set of directives to perform a series of automated steps to:
generate a treatment session patient model;
generate a first treatment plan and a second treatment plan for the treatment session patient model; and
select a treatment plan that is appropriate for the current treatment session.

29. The method of claim 28, wherein the set of directives includes information regarding a planned radiation dose, planned clinical goals, planned clinical goal values, a reference patient model, a reference treatment plan, reference plan quality values, control points, and a list of influencers.

30. The method of claim 29, wherein the generating of the treatment session patient model comprises:
generating a treatment session image of a portion of the patient containing an anatomy of interest; and
propagating the target structures of on the reference image to the treatment session image.

31. The method of claim 30, wherein the propagating of the target structures is guided by one or more influencers from the list of influencers.

32. The method of claim 30, wherein the generating of the first treatment plan comprises:
obtaining a reference isocenter location for the reference patient model from the set of directives;
determining an acquisition isocenter location for the treatment session patient model;
aligning target structures in the treatment session patient model with corresponding reference target structures in the reference patient model;
determining a difference between the reference isocenter location and the acquisition isocenter location;
determining a treatment session isocenter location by applying the determined difference to the acquisition isocenter location; and
using the treatment session isocenter location as an input to the plan generation and optimization algorithm to generate the first treatment plan.

33. The method of claim 32, wherein the generating of the second treatment plan comprises:
using the first treatment plan as an input to the plan generation and optimization algorithm to generate a current plan, wherein the plan generation and optimization algorithm includes optimization parameters which are automatically generated based on control points of the first treatment plan; and
generating the second treatment plan by optimizing the current plan based on plan quality values of the first treatment plan.

34. A system for implementing an automated workflow for an adaptive radiation therapy session of a patient, comprising:
a computer processing system configured to:
obtain a set of directives, the set of directives including information representing a planned treatment plan for the patient; and
using the set of directives, perform a series of automated steps to:
generate a treatment session patient model; and
generate an adapted treatment plan for the treatment session patient model,
wherein the planned treatment plan is generated based on dosimetric image data obtained in an internal radiation treatment protocol, the dosimetric image data indicating a radiopharmaceutical uptake within the patient.

35. The system of claim 34, further comprising a treatment planning system including:
a patient model generating module configured to:
automatically convert the radiopharmaceutical uptake into targets to be irradiated and targets to be avoided; and
apply an automated contouring process to generate target structures on an image used to generate the dosimetric image data, the target structures representing contours of the targets to be irradiated and contours of the targets to be avoided; and
a treatment plan generation and optimization module configured to:
allow for a selection of clinical goals from a clinical goal template for the target structures;
derive objectives for the selected clinical goals; and
generate a reference treatment plan that fulfills the derived objectives.

36. The system of claim 35, wherein the set of directives includes information regarding a planned radiation dose, planned clinical goals, planned clinical goal values, a reference patient model, a reference treatment plan, a list of influencer structures, one or more reference images, control points, and a list of influencers including anatomical structures that influence other anatomical structures of the patient.

\* \* \* \* \*